United States Patent
Aparicio, IV et al.

(10) Patent No.: US 6,581,049 B1
(45) Date of Patent: Jun. 17, 2003

(54) ARTIFICIAL NEURONS INCLUDING POWER SERIES OF WEIGHTS AND COUNTS THAT REPRESENT PRIOR AND NEXT ASSOCIATION

(75) Inventors: Manuel Aparicio, IV, Chapel Hill, NC (US); James S. Fleming, Apex, NC (US); Dan Ariely, Cambridge, MA (US)

(73) Assignee: Saffron Technology, Inc., Research Triangle Park, NC (US)

( * ) Notice: Subject to any disclaimer, the term of this patent is extended or adjusted under 35 U.S.C. 154(b) by 0 days.

(21) Appl. No.: 09/436,925

(22) Filed: Nov. 8, 1999

(51) Int. Cl.⁷ .................................................. G06G 7/00
(52) U.S. Cl. ...................................................... 706/39
(58) Field of Search .............................. 706/39, 41, 37

(56) References Cited

U.S. PATENT DOCUMENTS

| | | | |
|---|---|---|---|
| 4,660,166 A | 4/1987 | Hopfield | 708/801 |
| 5,073,867 A | 12/1991 | Murphy et al. | 706/42 |
| 5,103,405 A | 4/1992 | Murphy et al. | 706/62 |
| 5,487,133 A | 1/1996 | Park et al. | 706/20 |
| 5,619,709 A | 4/1997 | Caid et al. | 707/532 |
| 5,719,955 A * | 2/1998 | Mita | 382/158 |
| 5,870,729 A | 2/1999 | Yoda | 706/26 |
| 5,943,670 A | 8/1999 | Prager | 707/5 |
| 6,052,679 A * | 4/2000 | Aparicio et al. | 706/15 |
| 6,243,490 B1 * | 6/2001 | Mita | 382/158 |

FOREIGN PATENT DOCUMENTS

EP 0 461 902 A2 12/1991

OTHER PUBLICATIONS

International Search Report, PCT/US00/25604, Feb. 18, 2002.
*That's Not How My Brain Works*, Technology Review, vol. 102, No. 4, Jul./Aug. 1999, pp. 76–79.
*Report: IBM's Memory Agent*, Intelligence In Industry, vol. 8, No. 1, Jan. 1999, pp. 5–9.

\* cited by examiner

Primary Examiner—John Follansbee
Assistant Examiner—Joseph P. Hirl
(74) Attorney, Agent, or Firm—Myers Bigel Sibley & Sajovec

(57) ABSTRACT

An artificial neuron includes inputs and dendrites, a respective one of which is associated with a respective one of the inputs. Each dendrite includes a power series of weights, and each weight in a power series includes an associated count for the associated power. The power series of weights preferably is a base-two power series of weights, each weight in the base-two power series including an associated count that represents a bit position. The counts for the associated power preferably are statistical counts. More particularly, the dendrites preferably are sequentially ordered, and the power series of weights preferably includes a pair of first and second power series of weights. Each weight in the first power series includes a first count that is a function of associations of prior dendrites, and each weight of the second power series includes a second count that is a function of associations of next dendrites. More preferably, a first and second power series of weights is provided for each of multiple observation phases. In order to propagate an input signal into the artificial neuron, a trace preferably also is provided that is responsive to an input signal at the associated input. The trace preferably includes a first trace count that is a function of associations of the input signal at prior dendrites, and a second trace count that is a function of associations of the input signal at next dendrites. The first and second power series are responsive to the respective first and second trace counts. The input signal preferably is converted into the first and second trace counts, and a trace wave propagator propagates the respective first and second trace counts into the respective first and second power series of weights.

83 Claims, 19 Drawing Sheets

Phase 11

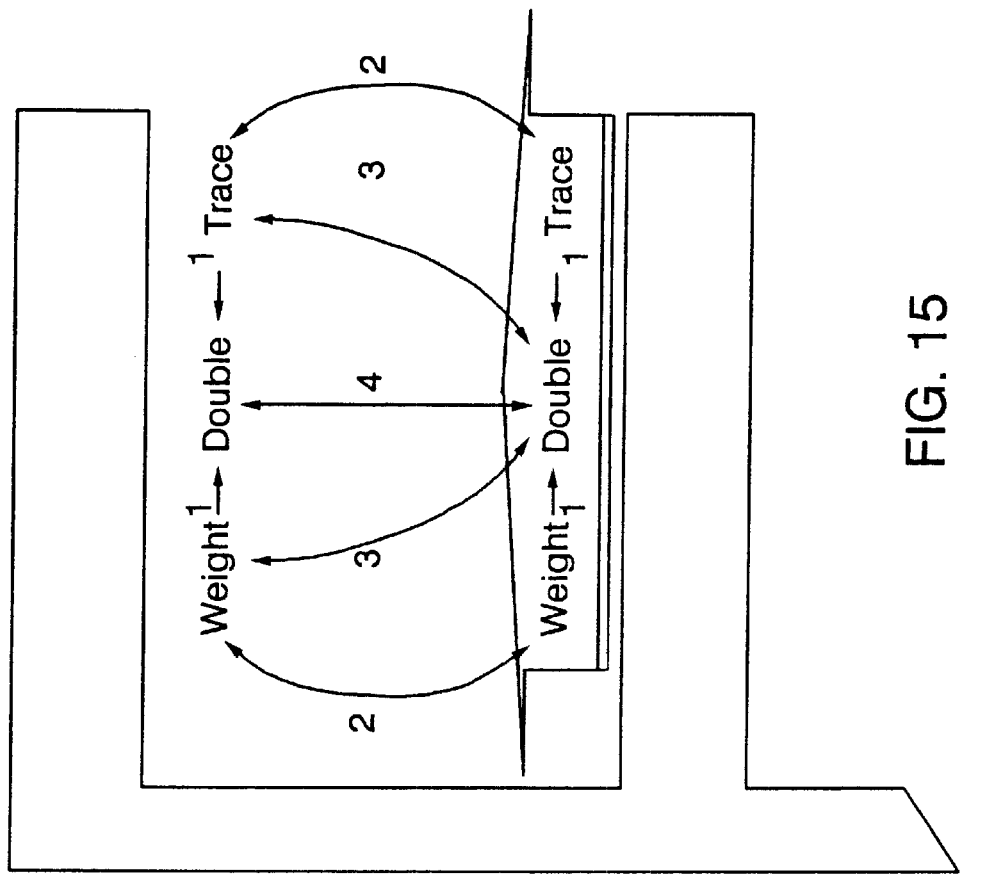
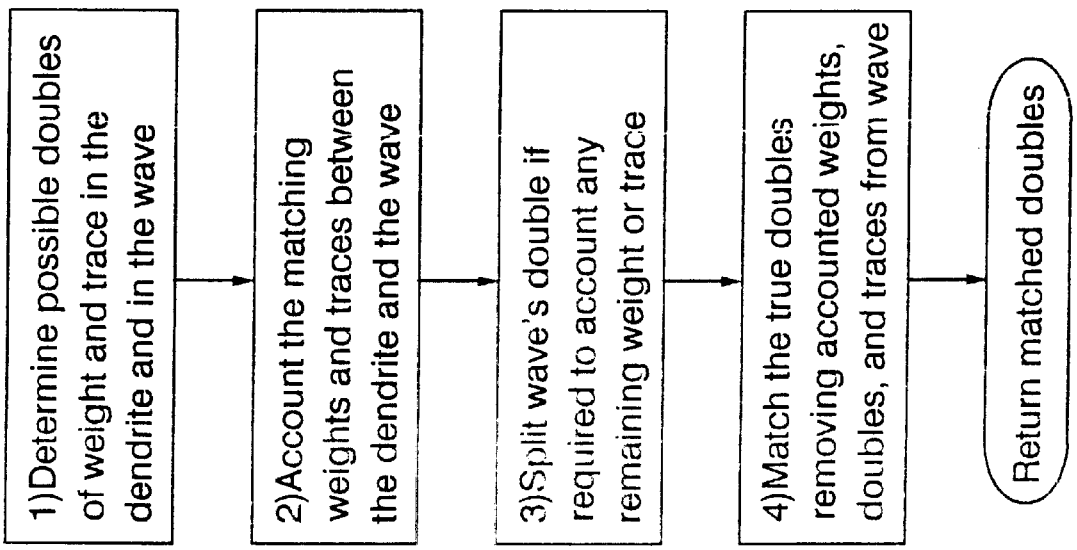
FIG. 15

FIG. 16
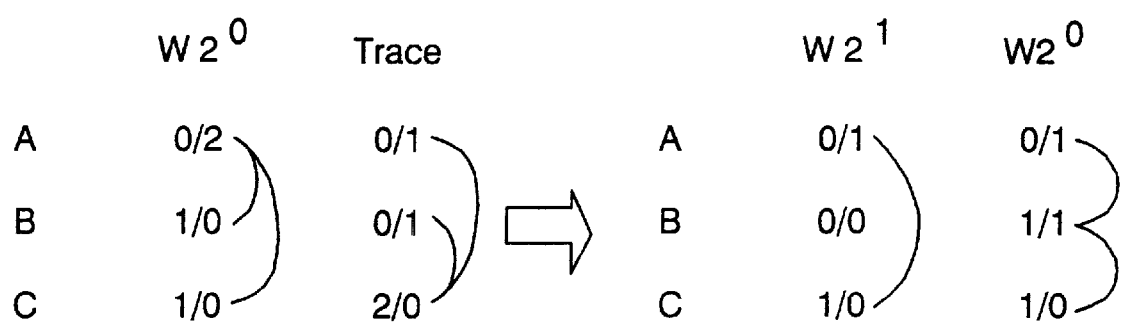
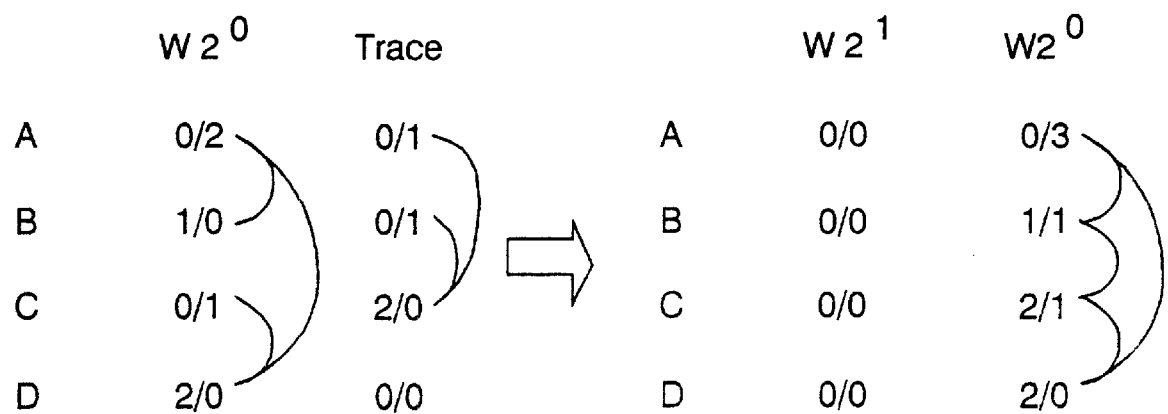

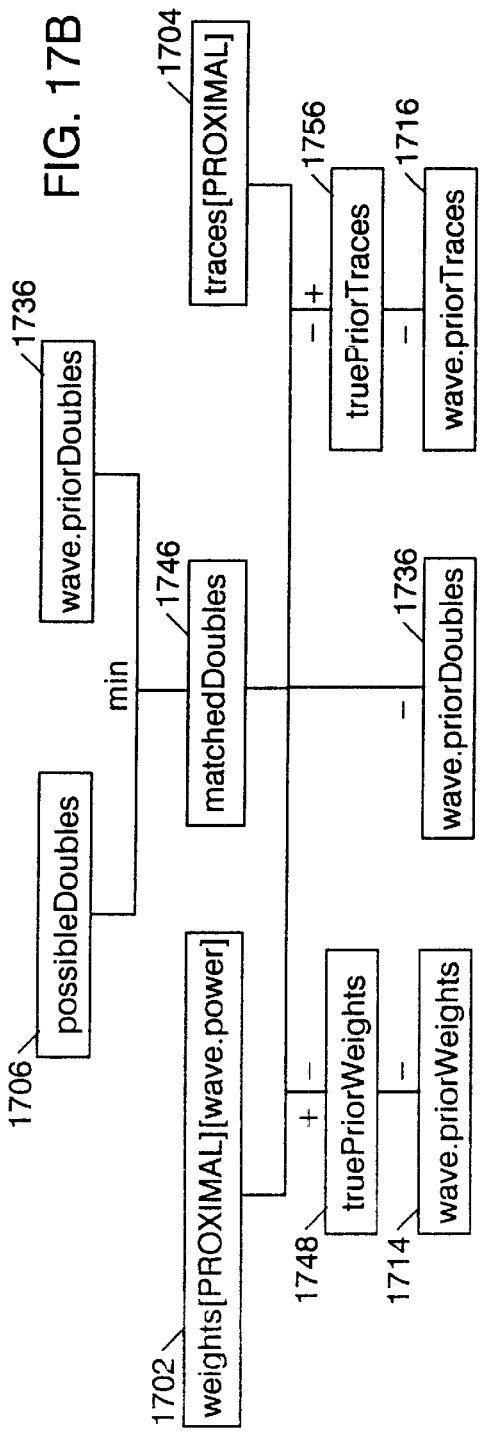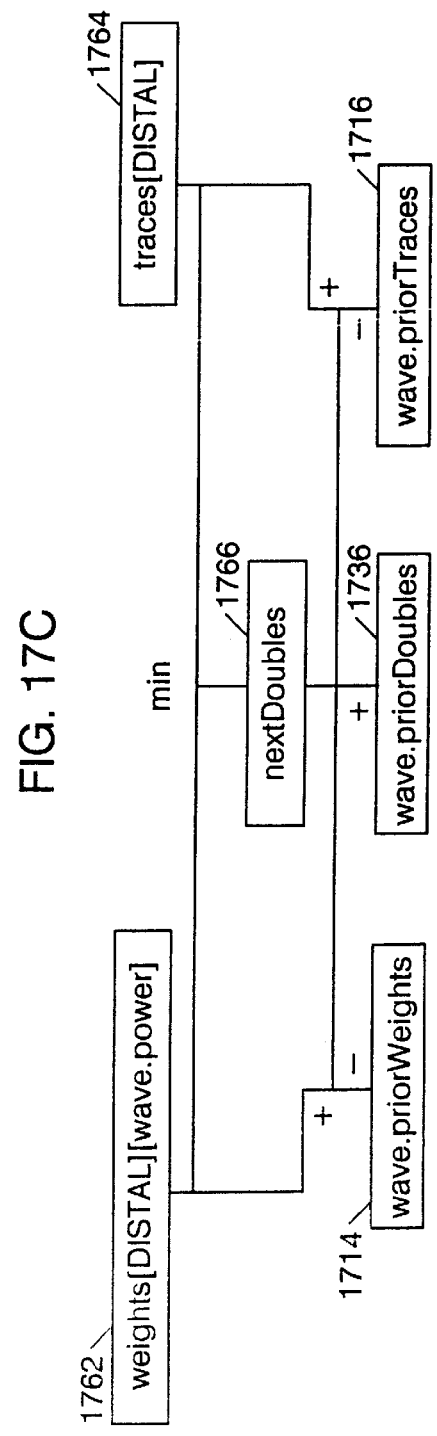

FIG. 18

1802
```
int possibleDouble = Math.min(traces[direction], weights[direction] [wave.power]);
int possibleTrace = traces[direction] - possibleDouble;
int possibleWeight = weights[direction][wave.power] - possibleDouble;

int matchedTrace = Math.min(wave.priorTraces, possibleTrace);
int matchedWeight = Math.min(wave.priorWeights, possibleWeight);

int residualTrace = possibleTrace - matchedTrace;
int residualWeight = possibleWeight - matchedWeight;
int forcedSplits = Math.max(residualTrace, residualWeight);

wave.priorTraces += forcedSplits;
wave.priorWeights += forcedSplits;
wave.priorDoubles = forcedSplits;
```

1804
```
int matchedDoubles = Math.min(wave.priorDoubles, possibleDouble);

int truePriorTraces = traces[direction] - matchedDoubles;
int truePriorWeights = weights[direction][wave.power] - matchedDoubles;

wave.priorTraces = truePriorTraces;
wave.priorWeights = truePriorWeights;
wave.priorDoubles = matchedDoubles;
```

1806
```
int nextDoubles = Math.min(traces[nextDirection], weights[nextDirection][wave.power]);
wave.priorDoubles += nextDoubles;
wave.priorTraces += traces[nextDirection] - nextDoubles;
wave.priorWeights += weights[nextDirection][wave.power] - nextDoubles;
```

ARTIFICIAL NEURONS INCLUDING POWER SERIES OF WEIGHTS AND COUNTS THAT REPRESENT PRIOR AND NEXT ASSOCIATION

FIELD OF THE INVENTION

This invention relates to artificial intelligence systems, methods and computer program products, and more particularly to artificial neuron systems, methods and computer program products.

BACKGROUND OF THE INVENTION

Associative memories, also referred to as content addressable memories, are widely used in the field of pattern matching and identification, expert systems and artificial intelligence. A widely used associative memory is the Hopfield artificial neural network. Hopfield artificial neural networks are described, for example, in U.S. Pat. No. 4,660,166 to Hopfield entitled "Electronic Network for Collective Decision Based on Large Number of Connections Between Signals".

Although associative memories may avoid problems in prior back-propagation networks, associative memories may present problems of scaling and spurious memories. Recent improvements in associative memories have attempted to solve these and other problems. For example, U.S. Pat. No. 6,052,679 to coinventor Aparacio, IV et al., entitled "Artificial Neural Networks Including Boolean-Complete Compartments" provides a plurality of artificial neurons and a plurality of Boolean-complete compartments, a respective one of which couples a respective pair of artificial neurons. By providing Boolean-complete compartments, spurious complement memories can be avoided.

Associative memories also have been marketed commercially. For example, a product known as MemoryAgent marketed by International Business Machines Corporation (IBM) provides a low level set of application programming interfaces that can be used for building embedded learning agents, characterized by the term "Smart Assistance". See the publication entitled "Report: IBM's Memory Agent", Intelligence In Industry, Vol. 8, No. 1, January 1999, pp. 5–9. Other vendors, including Haley Enterprises and Intellix A/S also offer associative memory tools. In particular, Haley Enterprises supports a commercial associative memory called "The Intelligent Memory". See http://www.haley.com/TIM.html. Intellix A/S supports another commercial associative memory called "Knowman" using a software framework called SOUL (Self-Optimizing Universal Learner). See http://www.intellix.com. Some vendors offer self-organizing feature maps, as described in U.S. Pat. No. 5,870,729 to Yoda entitled Self-Organizing Neural Network for Pattern Classification; and U.S. Pat. No. 5,943,670 to Prager entitled System and Method for Categorizing Objects in Combined Categories, which also are a form of associative memory. Associative memories also have been applied to electronic commerce, as shown in U.S. Pat. No. 5,619,709 to Caid et al. entitled System and Method of Context Vector Generation and Retrieval. Other applications of associative memories include handwriting recognition in hand-held devices, such as the Palm Pilot, marketed by 3Com.

Although associative memories only recently have been marketed commercially, they are expected to rapidly grow for applications that desire personalization and knowledge management. In fact, one expert has predicted that "Building autoassociative memories will be a very large business—some day more silicon will be consumed building such devices than for any other purpose." See Technology Review, Vol. 102, No. 4, July/August 1999, p. 79.

Unfortunately, there is a fundamental scaling problem that can limit the use of associative memories to solve real world problems. In particular, many associative memories use linear weights. As shown in FIG. 1A, each input can be associated once with each output according to a weight $W_A$–$W_E$. However, the inputs in such linear networks generally do not associate with each other. This can severely limit the ability of such networks to learn and represent possible nonlinearities, such as interactions between the inputs, that may be found in co-requirements or trade-offs between inputs.

An alternative to the linear network of FIG. 1A is the geometric Hopfield network of FIG. 1B. In the Hopfield network, one-to-one connections are provided between all nodes, and a weight is provided for each arch between the nodes. As shown in FIG. 1B, it may be difficult to scale Hopfield networks for real-world applications due to the explosion of weights that is provided between all inputs. Since nonlinear networks generally intercept all inputs with each other, an $N^2$ or geometric scaling function is produced. More specifically, the number of connections between inputs generally is equal to $N \cdot (N-1)/2$, where N is the number of inputs.

This geometric scaling generally is unreasonable to support applications at the scale of complexity that warrants such technology. For example, for general purpose search and personal modeling, tens of thousands of input variables and millions of models may need to be managed. At the other extreme, machine learning in operating systems may need to be more efficient as client machines become smaller, wireless devices. In such situations, only one user's model may be needed, but the number of contexts and input variables may still be very large. Even at the level of a household with a few individuals, the number of inputs may be on the order of hundreds of thousands. It therefore may be unreasonable to use present techniques in such applications, even in the larger physical memory capacities that are expected in the next few years. Thus, applications of agent-based learning for such environments are now emerging, but the learning technology to support these applications may be difficult to implement due to the scaling problems of learning and using nonlinear associations.

SUMMARY OF THE INVENTION

The present invention can provide an artificial neuron that includes a plurality of inputs and a plurality of dendrites, a respective one of which is associated with a respective one of the plurality of inputs. Each dendrite comprises a power series of weights, and each weight in a power series includes an associated count for the associated power. It will be understood that a weight generally is a place-holder for a count, and need not be a separate physical entity. The power series of weights preferably is a base-two power series of weights, each weight in the base-two power series including an associated count that represents a bit position. It has been found, according to the present invention, that, in part, by representing the weights as a power series, the geometric scaling as a function of input in conventional artificial neurons can be reduced to a linear scaling as a function of input. Large numbers of inputs may be handled using real world systems, to thereby solve real-world applications.

The counts for the associated power preferably are statistical counts. More particularly, the dendrites preferably are sequentially ordered, and the power series of weights preferably comprises a pair of first and second power series of weights. Each weight in the first power series includes a first count that is a function of associations of prior dendrites, and each weight of the second power series includes a second count that is a function of associations of next dendrites. More preferably, a first and second power series of weights is provided for each of multiple observation phases.

In order to propagate an input signal into the artificial neuron, a trace preferably also is provided that is responsive to an input signal at the associated input. The trace preferably includes a first trace count that is a function of associations of the input signal at prior dendrites, and a second trace count that is a function of associations of the input signal at next dendrites. The first and second power series are responsive to the respective first and second trace counts. Similar to the weights, each trace preferably comprises at least one first trace count that is a function of associations of the input signal at prior dendrites, and at least one second trace count that is a function of associations of the input signal at next dendrites. The first and second trace counts also may be represented by a power series.

In order to provide a memorizing operation, the input signal preferably is converted into the first and second trace counts, and a trace wave propagator propagates the respective first and second trace counts into the respective first and second power series of weights. The trace wave propagator preferably propagates the trace along the sequentially ordered dendrites in a forward direction and in a reverse direction. Carry results also preferably are propagated along the power series of weights in the plurality of dendrites to provide memorization of the input signal. A Double Match/Filter preferably identifies carry results for a weight in a dendrite, for propagation to a next higher power weight. The Double Match/Filter also preferably identifies carry results for a weight in a dendrite based upon co-occurrence of a weight and a trace.

In order to provide a reading operation, an accumulator accumulates matches between the first and second trace counts and the first and second power series of weights. The accumulator preferably accumulates matches between the first and second trace counts and all of the counts in the first and second power series of weights, regardless of whether carry results are produced. A summer is responsive to the accumulator, to sum results of the accumulations of matches of the first and second trace counts to the first and second power series of weights.

As described above, the weights preferably include first and second power series that are respective functions of associations of prior dendrites and associates of next dendrites. The association is an example of a statistical function that represents a characteristic of the associations rather than the associations themselves. Preferably, a sum of associations of prior dendrites and a sum of associations of next dendrites is used. However, other statistical functions may be used. It also will be understood that, although the prior/next relationships preferably are used with the power series weights, the prior/next relationships also may be used with conventional neural network weights to provide improved nonlinear interactions between the input nodes of the neural network. Finally, it also will be understood that the present invention may be embodied as systems, methods, computer program products and/or combinations thereof.

BRIEF DESCRIPTION OF THE DRAWINGS

FIG. 15 is a block diagram of a Double Match/Filter according to the present invention.

FIG. 16 illustrates examples of operations of a Double Match/Filter of FIG. 15 according to the present invention.

FIGS. 17A–17C and 18 are flowcharts of operations for Double Match/Filters according to the present invention.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention will now be described using the illustrations of FIGS. 3–20. It will be understood that an element of the illustrations, and combinations of elements in the illustrations, can be implemented by general and/or special purpose hardware-based systems which perform the specified functions or steps, or by combinations of general and/or special purpose hardware and computer instructions.

These program instructions may be provided to a processor to produce a machine, such that the instructions which execute on the processor to create means for implementing the functions specified in the illustrations. The computer program instructions may be executed by a processor to cause a series of operational steps to be performed by the processor to produce a computer implemented process such that the instructions which execute on the processor provide steps for implementing the functions specified in the illustrations. Accordingly, FIGS. 3–20 support combinations of means for performing the specified functions, combinations of steps for performing the specified functions and program instructions for performing the specified functions.

In order to facilitate a complete understanding of the present invention, a theoretical discussion of the separation and reconfiguration of an observation matrix into a linear structure first will be provided. Artificial neuron structures according to the present invention then will be described in detail. The generation and propagation of trace waves then will be generally described. Finally, operations of memorization (writing) and imagination (reading) will be described in detail.

Theoretical Considerations

The present invention has been inspired by the cerebellar structure, long believed to be an auto-associative memory. While the cerebellum was traditionally thought to record and play unconscious motor skills, it is now understood to play a role in all cognitive activity, particularly in imagining and decision making generally.

Figure 2:
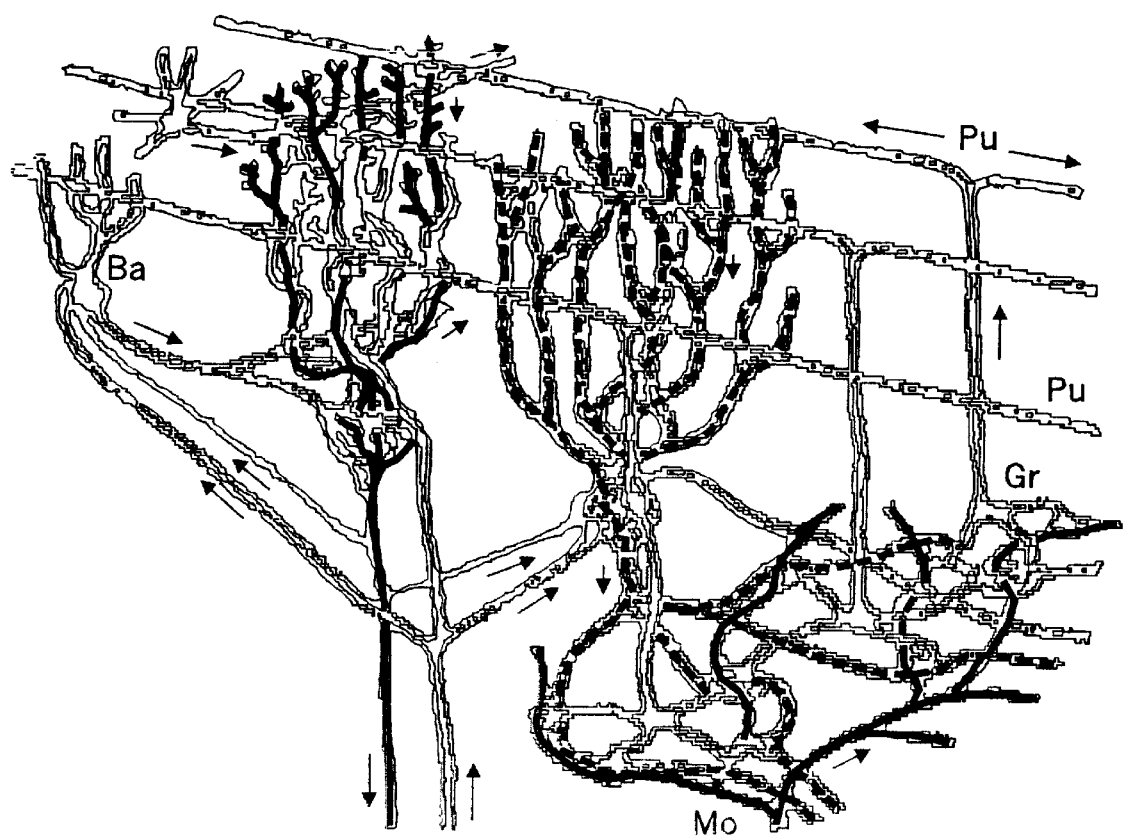
FIG. 2 is a diagram of neurons of the cerebellar cortex.

FIG. 2 is a reproduction of a neuron of the cerebellar cortex, reproduced from Llinas, *The Cortex of the Cerebellum*, Scientific American, Vol. 232, No. 1, Page 56–71, 1975. The Purkinje neuron Pu in the cerebellum is thought to represent an associative memory per se. Each Purkinje neuron has up to 100,000 input synapses—more than any other type of neuron. Computing and summing all this input, each Purkinje neuron sends one axon out from the cerebellum. Given this enormous fan-in, one assumption is that the associativity of the inputs to the output is linear, based on simple synaptic weights at each input and a summation (dot product) of these inputs and synaptic weights. However, the real dynamics of this and most other neurons are known to be highly nonlinear. Thus, nonlinear computational power appears to be present in these real, highly evolved systems, but the nature of the computation to produce an associative memory still appears to be unknown. However, it appears clear that the Purkinje neuron structure is a tree, not an astronomical plexus of $O(100,000^2)$ interconnections, as would be used in a nonlinear associator defined by a Hopfield neural network.

The present invention can provide artificial neuron systems, methods and/or computer program products that can virtually represent the learned interactions between inputs but can be physically implemented in a realizable system. In fact, an approximation of an $O(N^2)$ virtual representation will be shown as an $O(N)$ physical machine. Such pure linearity can allow scaling of high performance prediction and pattern matching, up to the Internet and down to small wireless devices.

Figure 3A:
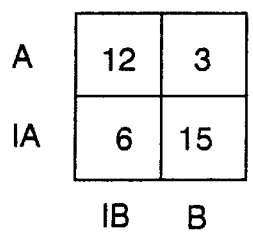
FIGS. 3A and 3B conceptually illustrate observations as polar phases.

A theoretical consideration can begin with a 2×2 observation matrix that is used in statistics. Given any two binary input variables (such as the flip of two coins), there are four possible observations. The 2×2 observation matrix is a set of four counters for the observed combinations. For instance, FIG. 3A shows two variables A and B. A can be ON or OFF, A or !A, respectively. This is similar for B. The observation count shows, for example, that the co-occurrence of A and B has been observed three times. Overall, it appears that A and B tend to exclude each other (represent a strong stochastic XOR relationship).

Figure 3B:
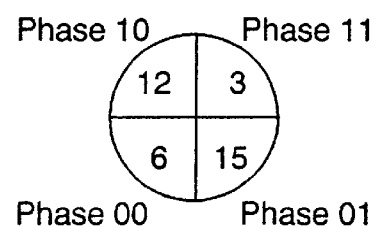

As shown in FIG. 3B, each of the four cell counters may be represented as one of four phases. Each phase is identified by 00, 01, 10, or 11 relative to the ON (1) or OFF (0) condition of each of the two inputs. In this case, the low bit represents the A coordinate while the high bit represents the B coordinate.

Figure 4A:
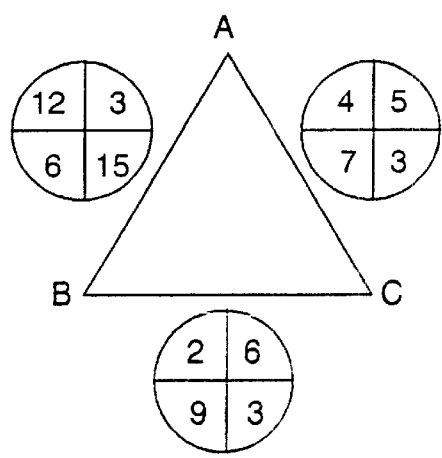
FIGS. 4A and 4B conceptually illustrate separation of observations into phase graphs.
Figure 4B:
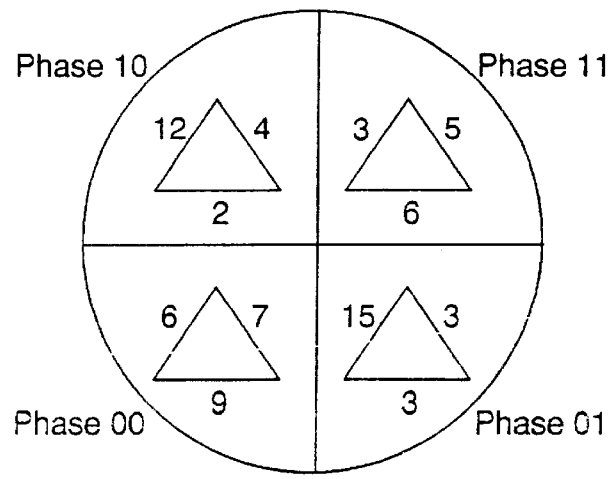

When more than two input variables are considered, an $O(N^2)$ number of 2×2 matrixes may be needed. For example, as shown in FIG. 4A, for three inputs (A, B, and C) there are three matrixes (A×B, A×C, B×C). Geometric scaling takes place with more inputs so that four inputs use six matrixes, five inputs use ten matrixes, etc. However, the simple graph of three inputs more clearly shows all relationships as a triangle. Each pair-wise edge of the triangle has a 2×2 observation matrix. Note that the sums of observations can be different, which allows the tri-state input values of true, false, and unknown.

The present invention can compress this representation of associations into a linear form. There appears to be little possibility of finding commonality across any two matrices. For example, the collapse of even two such matrices only may be accomplished if four observation counts match each other. In a worst case, all possible pair-wise matrices can be different from each other, allowing no compression by some combinations. However, the present invention can separate such counts in ways that can allow their compression.

Two rearrangements of these matrixes can result in graphs that have appropriate properties. The first rearrangement separates each of the phases from each other and recombines them into four graphs, one for each phase. See FIG. 4B. The result of each graph can leave only a single weight, rather than a matrix of weights, on each edge of the graph.

Figure 5:
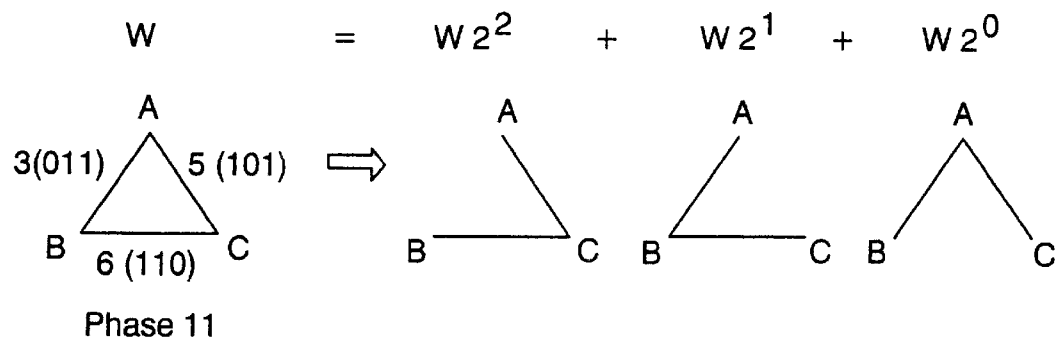
FIG. 5 conceptually illustrates separation of phase graphs into weightless graphs.

The second rearrangement separates each weight of the phase graph into a power series, preferably a base-two power series. FIG. 5 shows one phase graph with weights of 3, 6 and 5 between the input variables A, B, and C. The binary representation of each weight is also shown. Each bit of a weight represents the base-two power of that weight.

Because these bit powers are additive in representing the full magnitude of the weight ($6=2^2+2^1$), each phase graph can be further separated into a set of power graphs, one for each bit. FIG. 5 shows an example phase graph separated into three power graphs, for $2^2$, $2^1$ and $2^0$ magnitudes. The power of the graph is associated with the graph itself, but each graph now can be weightless, meaning that each arc represents one occurrence or nonoccurrence of an association between any two inputs for a particular phase and power.

A set of weightless graphs therefore can be produced. These graphs can each be of geometric size and can be further reduced, but the number of such graphs now may be contained. Given a representation of 2×2 matrixes (other basic shapes can also be decomposed as such), there are only four phases. As with the efficient binary representation of exponentially large weights, the binary separation of any weight then limits the number of power graphs to $\log_2$ (weight). Any particular weight is limited to the number of total memory loadings, M (assuming that all observations are of only on phase), with an expected value of M/4.

Continuing with the theoretical description, the weightless graphs then can be compressed, also into a linear form, using a statistic around each node. A statistic represents the characteristics around the node, but are not the characteristics themselves. For example, the number of links to each node is one such statistic. Each node may be characterized by one number, which may represent the number of associations of that node to all others. However, this statistic may not carry very strong constraints, such as which node-to-node associations are actually represented.

A preferred statistic may be obtained by analogy from dynamic programming. Dynamic programming techniques can reduce combinatoric complexity. Rather than explicitly accounting for all combinations, dynamic programming can find properties that allow implicit enumeration of many elements at once. Dynamic programming conventionally is used in tree structures. For example, each branch of a tree contains an exponential number of leaf nodes, but some problems have constraints such that an entire branch can be accounted at once. An exponential number of leaves are implicitly accounted, without the computational burden of actually accounting for each leaf.

Figure 6:
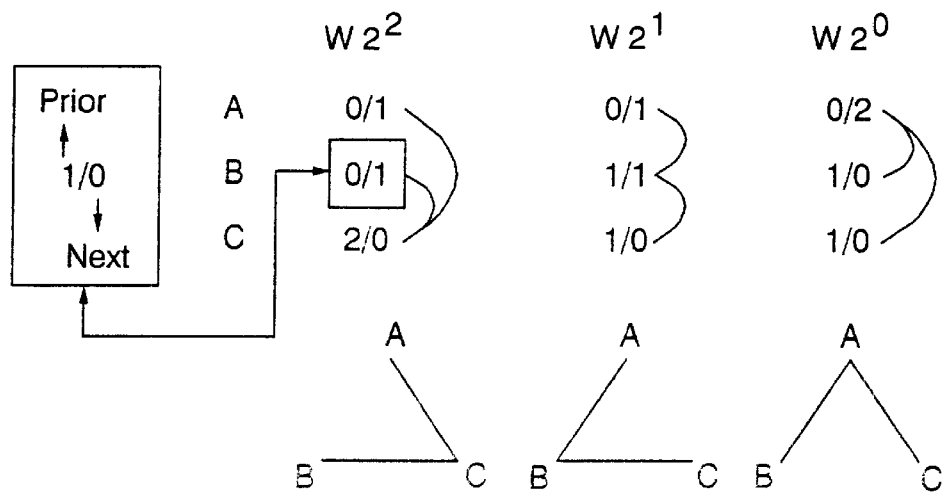
FIG. 6 conceptually illustrates dynamic program weights.

FIG. 6 illustrates a preferred statistic that can provide this implicit accounting. Since the power graphs of FIG. 5 are weightless, the weights of the linear array may be used to account for the number of edges belonging to each vertex of the graph. For example, the power graph of FIG. 6 for $2^0$ shows that A has two edges: one association to B and one association to C. While the sum of associations of one node to all other nodes may not force very strong constraints, ordering the vertices and separating each sum into the sum of associations to prior nodes and the sum of associations to next nodes can force very hard constraints, which can then be used to account for particular associations.

More specifically, each power graph is represented as a power series of ordered weight pairs, one weight of each pair representing all associations to inputs before it (prior inputs) and the other weight representing all associations after it (next inputs) in the ordering. The notation for the pair is shown as [prior]/[next], and each pair is shown associated with one and only one input. These weight pairs generally are highly constrained to each other. For example, the weights of A are 0/2 for $2^0$ weight power, representing two edges with B and C. The weight pairs of B and C are 1/0 and 1/0. Assuming the lexical ordering of A, B, and C, the prior weights of B and C match the next weight of A. In general, the sum of all prior weights has a compliment sum of next weights. As will be shown later, the constraints between these pairs actually can be much stronger.

FIG. 6 also shows that the sequential order of inputs can change the exact distribution of the weight pair. A single weight does not always map to the number of edges on the graph. For instance, the weights for B are 1/1 for the power graph $2^1$ only because B is ordered between A and C. One edge with A is prior to it and one edge with C is next after it. The ordering itself is otherwise arbitrary.

This completes the theoretical discussion of separation and reconfiguration of the observation matrix into a linear structure. Specifically, the scaling factor generally is $4*\log_2(M)*2N$. There are four phases. The number of power graphs for each phase grows as a log function of observations, M. Each graph is represented by two weights for each input, given N such inputs.

Artificial Neuron Structures

Figure 7:
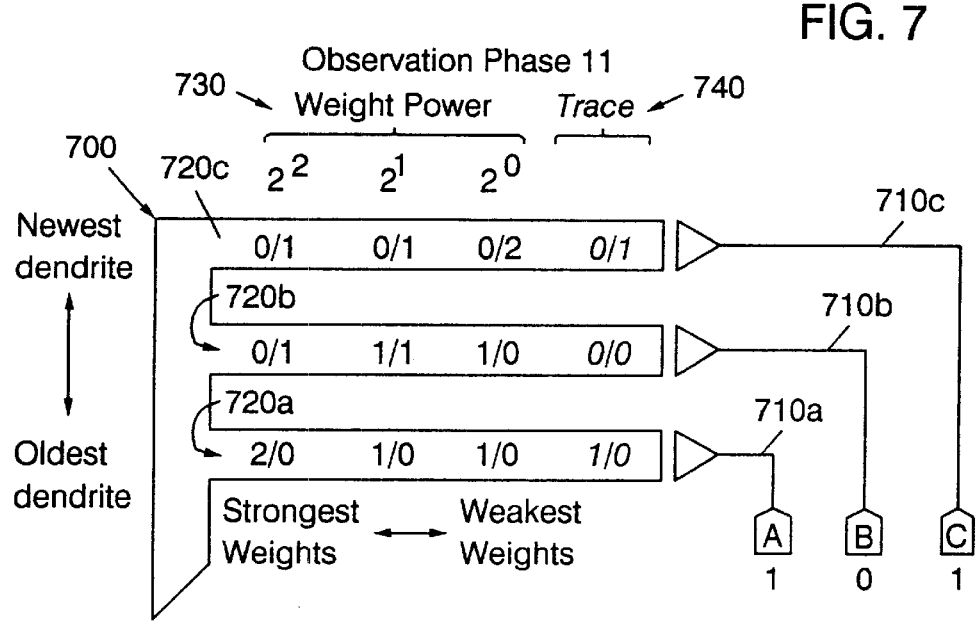
FIG. 7 is a block diagram of neurodendritic structures according to the present invention for a single observation phase.

FIG. 7 is a block diagram of artificial neurons according to an embodiment of the present invention. As shown in FIG. 7, the artificial neuron 700 includes a plurality of inputs 710a–710c and a plurality of dendrites 720a–720c. A respective dendrite is associated with a respective one of the inputs. Each dendrite comprises a power series 730 of weights. Each weight in a power series includes an associated count for the associated power. Preferably, as shown in FIG. 7, the power series of weights is a base-two power series of weights, so that each weight in the base-two power series includes an associated count that represents a bit position. The artificial neuron 700 of FIG. 7 represents a single observation phase, here observation phase 11 of FIG. 6. Each dendrite preferably comprises at least a second power series of weights corresponding to a second observation phase, as shown in more detail in FIG. 8. Finally, still referring to FIG. 7, each power series of weights preferably comprises a pair of first and second power series of weights. Each weight in the first power series preferably includes a first count that is a function of associations of prior dendrites, and each weight in the second power series preferably includes a second count that is a function of associations of next dendrites. The counts of prior and next dendrites are indicated by a "/" so that, for example, the notation 0/1 for the $2^2$ power of the dendrite 720c indicate zero prior associations and one next association.

Thus, each input or sensor neuron 710a–710c is connected to one dendrite branch 720a–720c. With this branch, the weight pairs for each power preferably are arranged from strongest to weakest. These weights are persistent. They can represent all the accumulated experiences that have been stored in the particular multipolar neuron.

In addition, each dendrite also contains a trace store 740 also referred to as a trace, which is transient. A trace 740 represents the current active sensor signal. The trace many be analogized to a post-synaptic biochemical trace (intracellular calcium buildup) left by sensor signaling. According to such biochemistry of learning, if a strong signal to memorize the signal follows the sensor signal, the trace signal interacts with the memorize signal to effect a permanent change in the dendritic weights.

A representation of a trace according to the invention preferably is not as simple as a direct recording of the sensor signal. The trace representation preferably is converted into the same structure as the weights, preferably a power series of prior/next associations. In a sense, the trace may be regarded as the weakest "weight". The trace, rather than the sensor signals themselves, are used in the neuron's computational dynamics. The weights and trace preferably are in the same form for their most efficient computation together, as will be described below.

Figure 8:
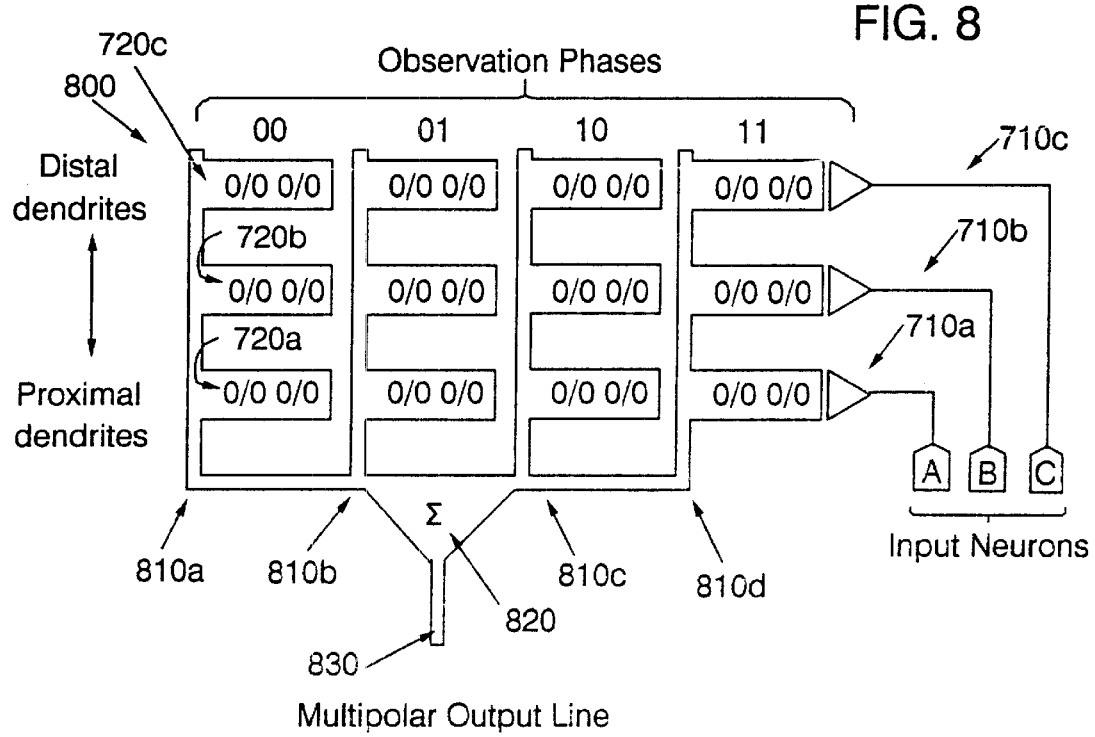
FIG. 8 is a block diagram of a multipolar neuron including multiple observation phases according to the present invention.

While FIG. 7 shows the dendritic arrangement for one phase, FIG. 8 represents all the phases, powers, and weight pairs to provide a multipolar neuron 800. FIG. 8 shows the initialized state of such a neuron. All weights and traces are initialized to zero, and there are no higher weight powers. Each major branch 810a–810d of the neuron 800 represents one of the possible observation phases. The outputs of the branches 810a–810d are summed at summing node 820 to provide an output on a multipolar output line 830.

Note that inputs 710a–710c are represented by sensor neurons. Each sensor neuron connects to a lateral dendritic branch at its appropriate level. The sensor neuron connects with every lateral branch at its level, but this is not shown for simplicity. Each lateral branch stores its weight pairs across all powers as detailed in FIG. 7.

Since the mathematics allows the arbitrary ordering of sensors and their weights for dynamic programming, biological neural architecture apparently has been decided on birth order. The terms proximal and distal rather than "prior" and "next", respectively, are used in FIG. 8 to indicate the oldest and newest dendrites, respectively. The later terms may properly represent the birth order of sensors and connections to the multipolar neuron, but the former terms may be clearer and more structural. Proximal dendrites are closer to the cell body (summing node 820). They are formed first by the earliest sensor inputs to connect. By analogy to neuro-cortical systems, new growth is added at the distal "surface". In other words, newer dendrites are connected distally, after the earlier dendrites.

The dendritic structure may change over time. The ordering of dendrites may be from oldest to newest as shown, but this ordering can be rearranged to improve performance and to add more information. For instance, the stronger dendrites can be ordered to be more proximal. This could overlay a stronger ordering of phases so that, for example, phase 01 can be considered weaker than 10.

Trace Wave Propagation

The creation of a trace is the simplest of the multipolar dynamics for artificial neurons according to the present invention, and can show how the linear array of weight pairs represents observations and their memories. Accordingly, trace creation and trace wave propagation now will be described.

Figure 9:
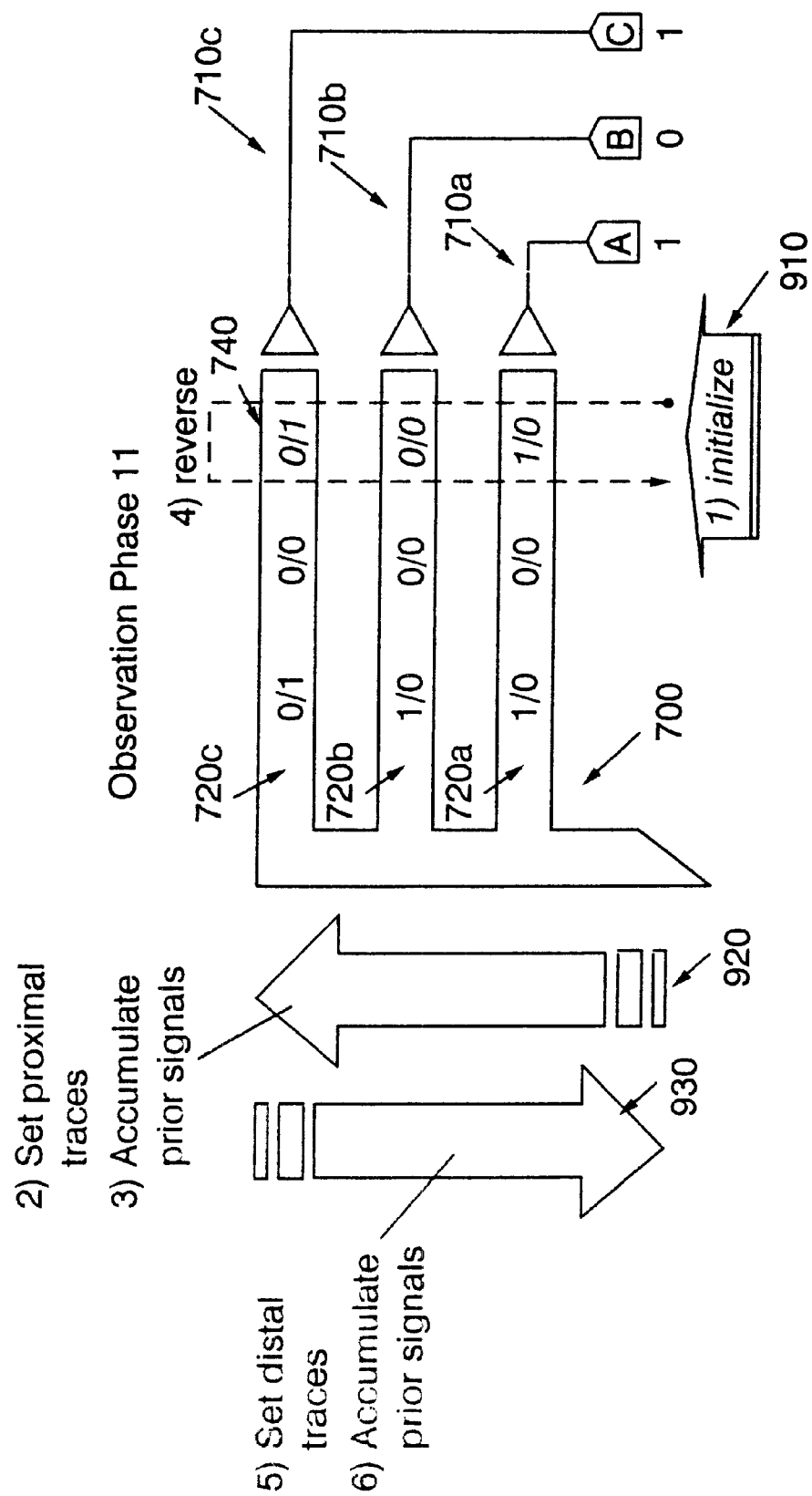
FIG. 9 conceptually illustrates trace wave propagation according to the present invention for a single observation phase.

Dynamics of the multipolar neuron preferably are mediated by the propagation of waves from one dendrite to another. Such wave propagation is known across biological neural systems and has been very well studied in Purkinje neurons. FIG. 9 shows how the wave moves across the dendrites to trace the sensor signal. While the biology may be more of a parallel processor and may update the trace as each sensor signal changes, the computational model starts the wave at the soma (the cell body) of the multipolar neuron. The wave preferably moves from the proximal dendrites (arrow 920) and then from the distal dendrites (arrow 930) in one pass.

Referring to FIG. 9, first, the wave is initialized to represent the given phase of the dendrite, as shown by arrow 910. The two bits of the phase, high bit and low bit, are kept in the wave as a highFilter and lowFilter. This setting of "high" and "low" can be arbitrary, as long as each dendrite will assume two perspectives: 1) calculating its associations to dendrites before it; and 2) calculating its associations to dendrites after it. In order to calculate the existence of an association between such dendrites—given a particular phase—one dendrite acts as one bit of the phase while another one acts as the other bit of the phase. For example, for phase 10, one dendrite must decide if its input is ON while another dendrite must determine if its input is OFF for the two of them to represent one such association. By convention, prior dendrites are assumed to act as the high bit while the next dendrite acts as the lower bit. More correctly, each dendrite acts first as the low bit, when calculating its associations to prior dendrites, and then acts as the high bit (acting like a prior dendrite) when passing its own signal into the wave to the next dendrite.

As the wave moves across the dendrites, the highFilter represents the sensor signal for the dendrite to be considered active within the given phase from the perspective of being the proximal dendrite in association with other distal dendrites. The lowFilter takes the opposite perspective; it represents the sensor signal for the dendrite's perspective as the distal dendrite in association with other proximal dendrites. Again, this assignment of "high" and "low" is merely by convention. In general, each dendrite acts as one bit of the phase for one perspective and then the other bit for the other perspective.

The wave's priorSignals counter is initialized to 0. As the wave moves across the dendrites, they accumulate their signals for association to the next dendrites.

Figure 10:
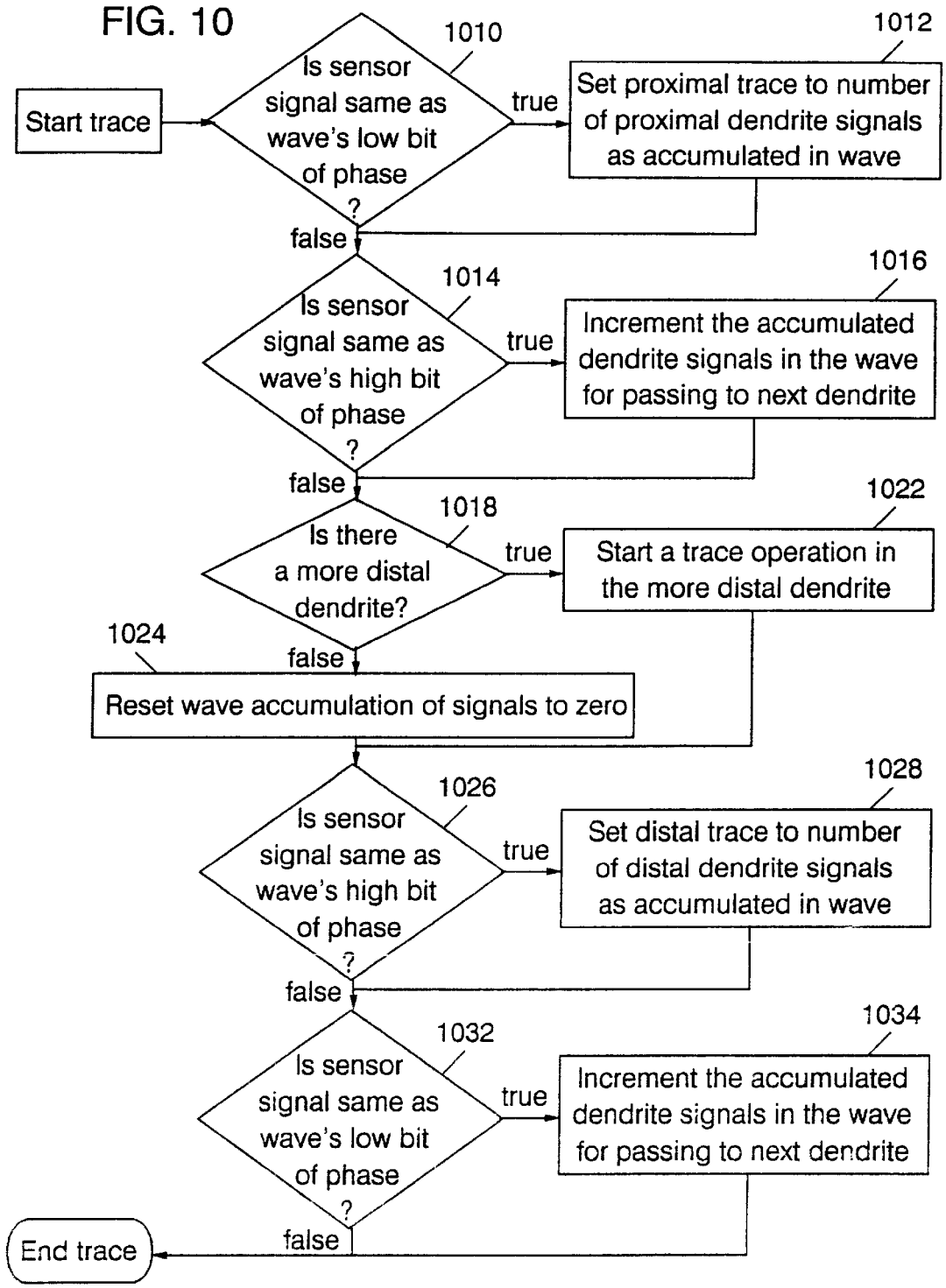
FIGS. 10 and 11 are flowcharts illustrating operations for trace formation according to the present invention.

FIG. 10 is a flowchart of computations within each dendrite. When the wave first passes into a dendrite, the dendrite takes the perspective of the low bit, distal dendrite. It compares the wave's low filter to the sensor's signal. If they are the same, then it is active in this perspective. The number of associations that are proximally active are found in the wave's accumulation of prior signals. It will be understood that the first dendrite does not see any prior signals.

The dendrite then takes the perspective of the high-bit proximal dendrite before the wave moves to the next dendrite. If the wave's low bit filter matches the sensor's signal, the dendrite is active in this perspective for this phase and accumulates itself in the wave's prior signals counter. As the simplest form of the multipolar's dynamic programming, the trace wave propagation shows how one dendrite, representing one sensor input, can implicitly enumerate all associations to other dendrites and their signal patterns.

In particular, at Block 1010, a test is made as to whether the sensor signal is the same as the wave's low bit of phase. If yes, then at Block 1012, the proximal trace is set to the number of proximal dendrite signals, as accumulated in the wave. If not, a test made at Block 1014 as to whether the sensor signal is the same as the wave's high bit of phase. If yes, then the accumulated dendrite signal's in the wave are incremented for passing to the next dendrite at Block 1016. At Block 1018, a test is made as to whether there is a more distal dendrite, and if yes, then the trace process is started in the more distal dendrite at Block 1022. If there is no more distal dendrite, then the wave accumulation of signals is set to 0 at Block 1024 and a test is made at Block 1026 as to whether the sensor signal is the same as the wave's high bit of phase. If yes, then at Block 1028, the distal trace is set to the number of distal dendrite signals as accumulated in the wave. At Block 1032, a test is made as to whether the sensor signal is the same as the wave's low bit of phase. If yes, then the accumulated dendrite signals are incremented in the wave for passing to the next dendrite at Block 1034.

The dendrite structure preferably is recursive. Each dendrite is connected to a possible next dendrite. Each dendrite propagates the trace signal to the next dendrite, the most distal dendrite tells the wave to reset itself (set the priorSignals back to 0) and returns control to the prior dendrite recursively. The return propagation preferably works like the forward propagation. The distal pass of the wave calculates the proximal traces, while the proximal pass of the wave calculates the distal traces.

Those skilled in the art of electronic design and parallel processing will recognize that these traces may be updated with real-time propagation in physical hardware. For example, any signal change can propagate proximally and distally at the same time, beginning with the dendrite associated with the changing sensor. Such waves preferably would propagate a prior change in signals rather than prior signals, but the dynamics otherwise can be identical. The single pass operations described above may be more efficient for sequential processing computer architectures. All sensor signals are assumed clamped and stable when the trace signal is called; all possibly parallel propagations are computed once in a single sequential pass.

Figure 11:
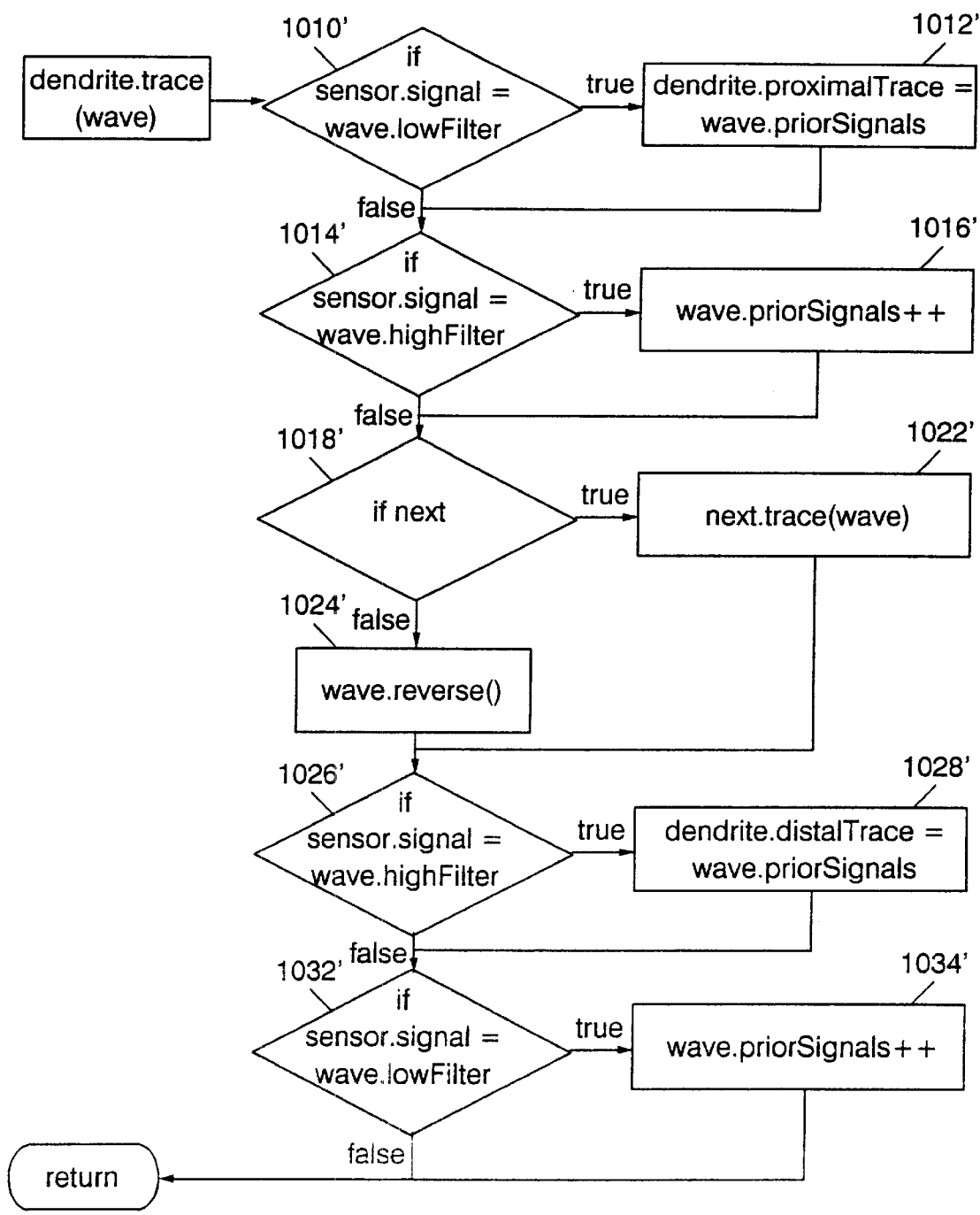

FIG. 11 represents the same flowchart as in FIG. 10, but as programming code. Like numbers are used, with prime (') notation. A dendrite object has a trace member function that takes a wave object as its argument. Each dendrite has a Sensor object as its member. The dendrite compares its sensor's signal with the wave's filters (Blocks 1010', 1014', 1026' and 1032'). If one equals the other in the case of the lowFilter, then the dendrite sets its proximalTrace to the priorSignals carried by the wave (Blocks 1012' and 1034'). In the case of the highFilter, the dendrite increments the wave's priorSignals to account for the sensor's signal (Blocks 1016' and 1028').

Each dendrite object is recursively connected to another more distal dendrite. Each dendrite calls the trace member function of such a next dendrite, if it exists. The trace function returns void.

Memorization

A description of memorizing or writing into an artificial neuron according to the present invention now will be provided. Memorization generally is more complex, preferably using more than one wave propagation. Multi-wave propagation also may be indicated in the cerebellum in that a single signal from the climbing fiber causes a burst of activity in the Purkinje neuron. FIG. 2 shows the climbing fiber (Cl) and how it surrounds the Purkinje neuron's dendrites. Given the sensor signal's formation of the trace signal, the climbing fiber may provide the memorize signal.

Figure 12:
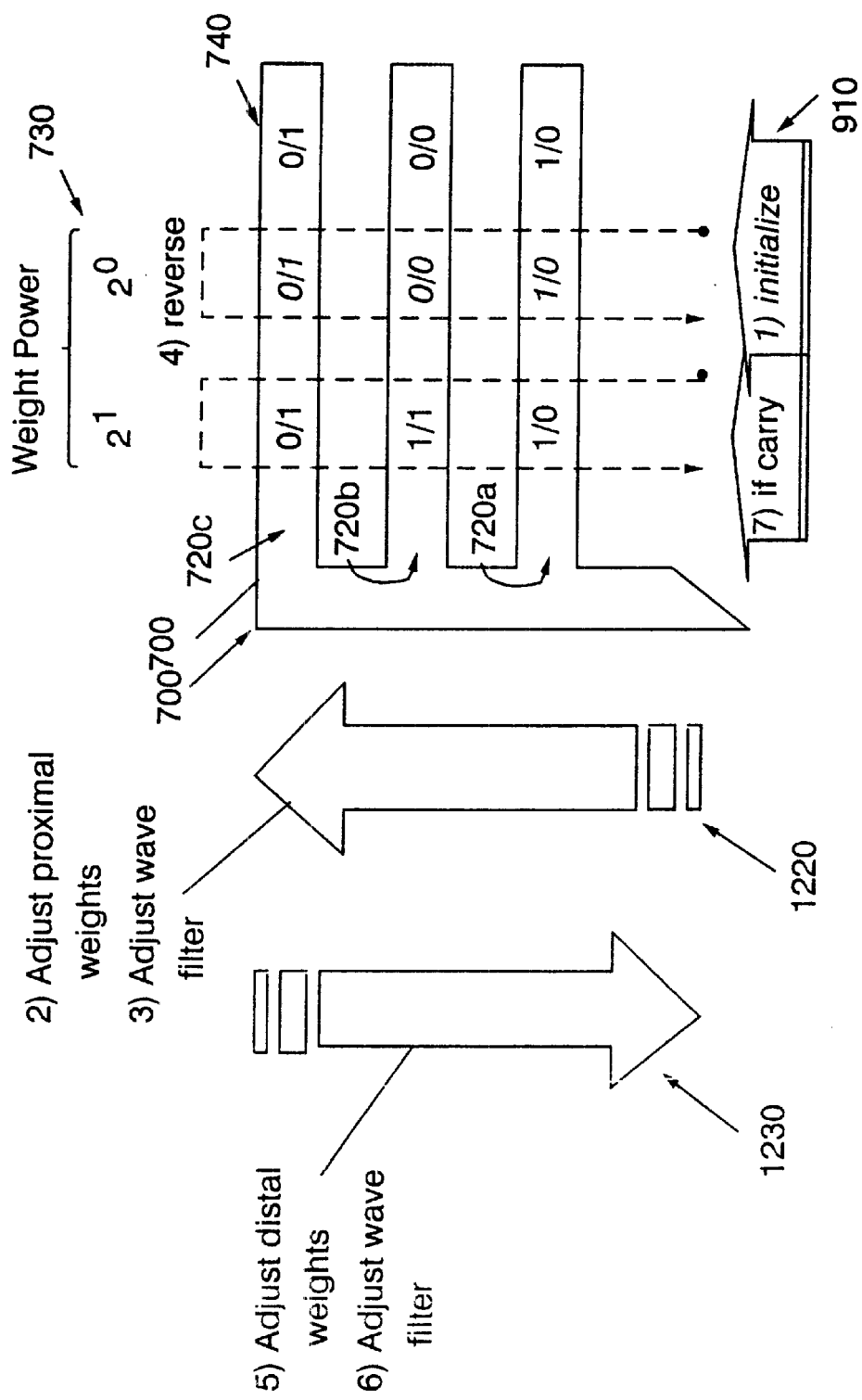
FIG. 12 is a block diagram of memorization for neural networks according to the present invention.

Analogous to the biology, a memorize signal to a multipolar neuron of the present invention generally causes a burst of wave activity. FIG. 12 shows that the neuron initializes (arrow 910) and propagates a wave through the dendritic field (arrows 1220 and 1230), much like the formation of a trace. However, the weight structure is more complex than the trace and may use several passes. As shown, each wave passes through each power of the weights. Starting from the weakest $2^0$ weight column, the memorize signal causes a transfer from the traces to the more permanent weights.

The example shown in FIG. 12 is simple. The trace weights are simply accumulated to the permanent weights at $2^0$. However, the separation of observation weights into power graphs and the resulting power columns in the dendritic field may produce a carry functions from one weight power to another. For example, addition and carrying in binary codes is simple. When adding one bit to another, the value of the bit is doubled, and hence needs to be shifted into the next, higher-bit column. If the higher bit is off, then it is turned on. If the higher bit is on, then it is doubled and needs to be left-shifted into its next, higher bit column. This operation continues until the carry bit propagates appropriately.

FIG. 12 represents this need to carry the results of one weight column into the addition of another weight column. For each weight power, the multipolar neuron propagates a wave, so long as the returning wave indicates that some values must be carried. Depending on the memory load and the effect of the new signal pattern, a $\log_2(O)$ number of wave bursts can be expected. In actual practice, only a few such waves may be expected, because unless the carry flows all the way to the highest order power, the waves pass through only a subset of powers.

Although the memorize function is complex, it may be viewed as somewhat similar to the trace formation described above. The wave generally travels to each dendrite in succession, modifying the proximal weight (like forming the proximal trace) and changing the wave as well to implicitly communicate its activity with other more distal dendrites through dynamic programming. The wave adjusts the proximal weights, and then reverses to adjust the distal weights. However, the nature of the dynamic programming generally is more intricate and elegant, as now will be described.

Figure 13:
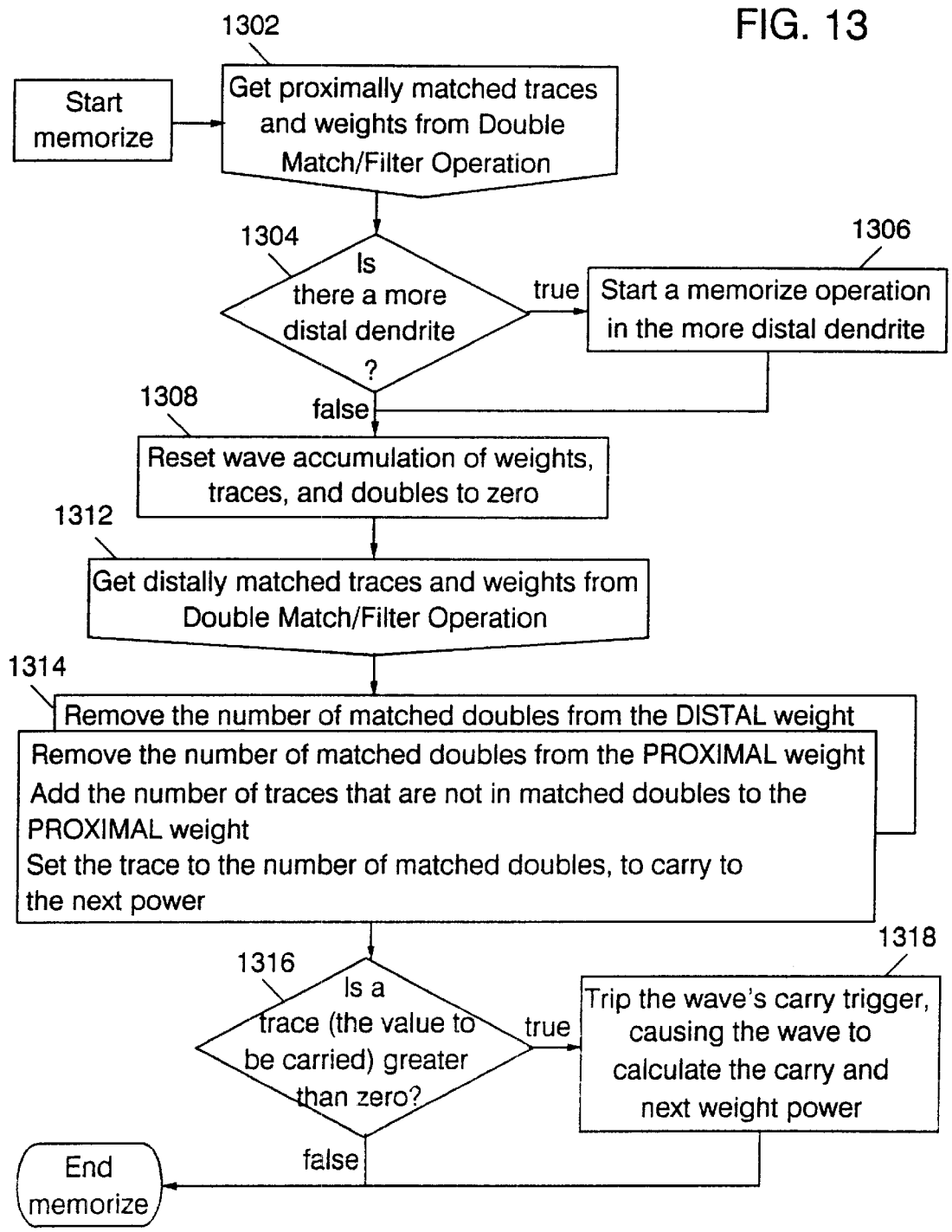
FIGS. 13 and 14 are flowcharts of operations for memorization according to the present invention.

Memorization first will be generally described. Then, a detailed description of carrying from one weight power to another will be described. FIG. 13 shows the overall memorization operation and its call to the Double Match/Filter to be introduced next.

In particular, when the wave first enters a dendrite, the dendrite assumes the perspective of the distal dendrite. Given both its proximal weight and trace values, the dendrite must determine whether the addition caused by the trace should be added to the current weight or carried to the next power. The logic of the decision is much like in binary coding: if the association does not exist, then the weight is set so that it does exist. If the association already exists, then the old and new association account for two-of-the-same and should be left-shifted to a higher power. As will be described below, Double Match/Filter finds such "doubling" of the currently known associations, which should be carried to the next power.

Referring now to FIG. 13, the Double Match/Filter (Block 1302) extracts the number of proximal doubles that should be carried forward and also alters the wave, which the dendrite sends to the next dendrite (Block 1306), if there is one (Block 1304). The wave returns (Block 1308) and the Double Match/Filter is called again (Block 1312), this time to extract the number of distal doubles (Block 1314).

Once the number of doubles is determined to carry forward to the next power (Block 1316), the weights at the current power can be determined (Block 1318). Both proximal and distal weights are decremented by the number of associations (doubles) that should be carried forward. In other words, if the weight already held an association and the sensor signals added it again, the association should be removed from the current power and doubled into the next. Each weight is then incremented to account for the new trace values, minus those that matched old associations and are accounted in the doubles to be carried.

Finally, the doubles are carried by assigning them as traces for the next weight powers to add, as done for the lowest weight power. If there are in fact any doubles and they are set as the trace values for the next wave, then the wave's carry trigger is set true. The multipolar neuron sends a burst of waves, each tuned to a higher weight power until there are no more associations to carry forward.

The time scaling factor is the same linear O(N) function as it is for the space complexity. The neuron creates one wave, which is tuned 4 times for each phase of its dendritic field. Within each phase, a $\log_2(O)$ number of bursts (maximum possible bursts) complete the weight change.

Figure 14:
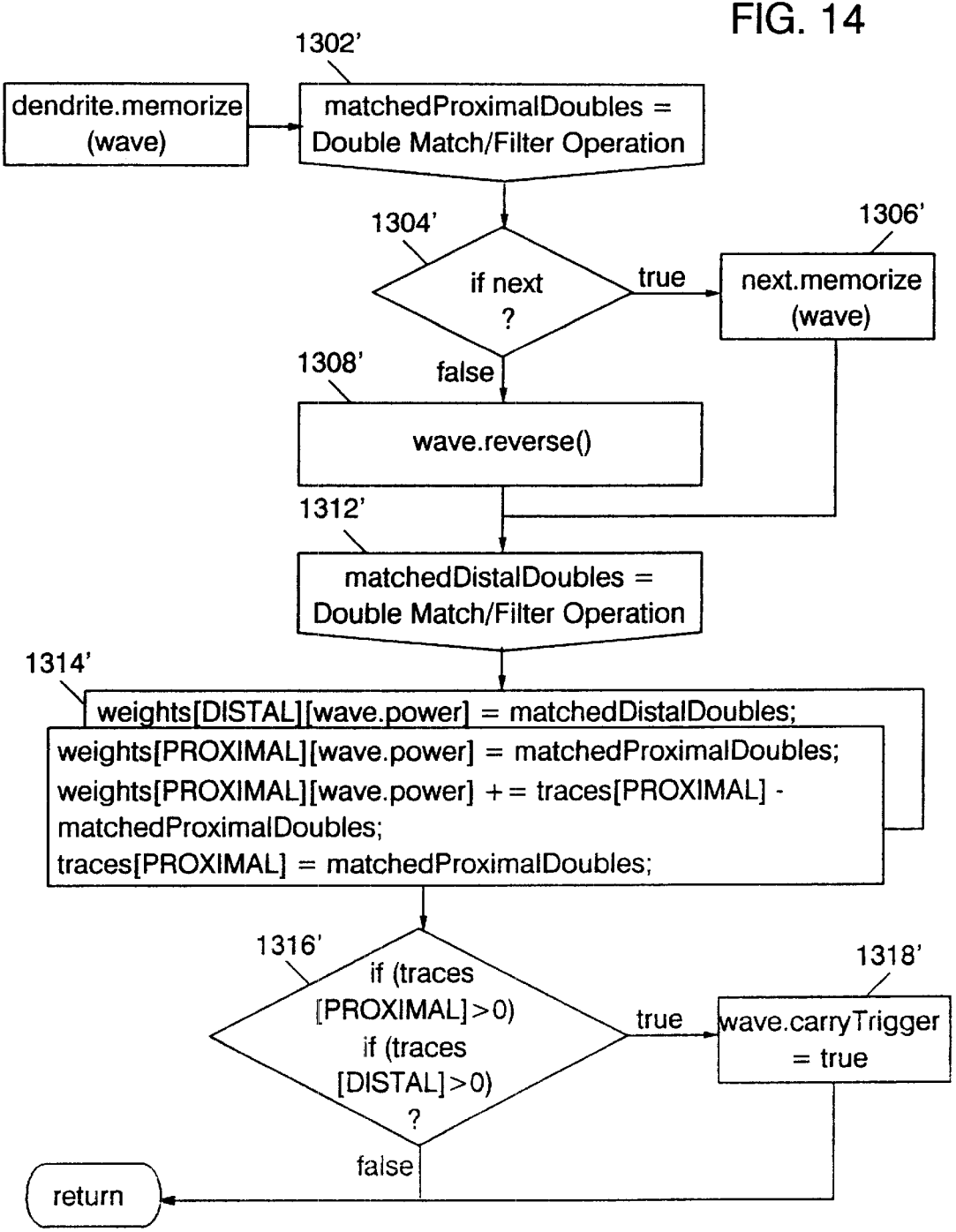

FIG. 14 shows an example of programming code for the weight modification operation. Like numbers to FIG. 13 are used with prime (') notation. The Dendrite object has a memorize member function that takes a wave as an argument, much like the trace function. Calling the next dendrite to memorize is also recursive and returns void. Otherwise, memorization involves the calculation of the matchedProximalDoubles (Block 1302') and matchedDistalDoubles (Block 1312') though a separate function that implements the Double Match/Filter process. Each dendrite has a doubly indexed array of weights. One index points to the DISTAL or PROXIMAL direction while the other index points to the weight power, which is determined by the passing of the wave as its power. The weight is adjusted in two ways. First, any matched doubles are subtracted (since they will be carried) and then the trace is added back in (minus any matched doubles, which also represent what needs to be carried). See Block 1314'.

The traces are reassigned to the number of match doubles. This represents the value to be carried to the next wave power. In order to use the same memorize function (Block 1306') on subsequent passes of the wave, these carry values are placed in the trace, just as if they represented input signals for the next weight power—which in fact they are.

Before returning, the dendrite determines whether there is in fact anything to carry in the traces (Block 1316'). If so, it trips the wave's carryTrigger (Block 1318') so that it passes back at a higher wave power.

The most intricate part of this linear scaling is the operation for finding doubles. The actual power graphs explicitly represent edges of the graph, so it can be determined if a particular association exists or not. An association of a particular power between two inputs is represented as one and only one edge between the respective input vertices. The linear weight scheme inside the dendrites may be much more peculiar and can represent a geometric number of associations, but it can be very difficult to see that one dendrite/sensor has an association with another.

However, the dynamic programming of wave propagation can account for these associations. As was shown in FIG. 6, a distal weight of 2 must encounter 2 proximal weights to match it. Considering the highest power column in FIG. 6, the weight of 2 at A will first encounter a 1 at B (A and B are associated) and another 1 at C (A and C are associated). B and C could also have had a matched pair of proximal and distal weights, but they did not have such an association in this example.

FIG. 15 establishes the relevant values and operation sequences for computing these constraints. In FIG. 15, the neuron is represented schematically for clarity. Given that the weights and traces preferably are in the same format, the wave can propagate and account for both of them as it passes across the dendrites. In fact, the wave has accumulators for both priorWeights as well as priorTraces. Moreover, the number of doubles generally is the more critical relationship to track and match. The wave has an accumulator for priorDoubles. Thinking of just one association, a double is the co-occurrence of a weight and a trace. In other words, the association already exists and the addition of the trace strengthens or doubles it. Because dendritic weights account for a number of associations, the double is the minimum value of the weight and trace counters.

More specifically, the dendrite generally can calculate only the number of possible doubles. Although a dendrite may have some number of weights and some number of traces, there generally is no local guarantee that they represent the same associations. For example, input A might have an old association with B and a new trace with C. But A has no explicit connection with B or C to decide this. Imagine that the proximal dendrite is "looking" distally through the weights of the other dendrites trying to determine if there is another double, with which to match. There is too much noise and confusion of weights in such a perspective. Fortunately, there are a number of intricate constraints, allowing another form of dynamic programming to match-and-filter such doubles.

FIG. 16 provides some examples. The specifics of the Double Match/Filter are very intricate and may be difficult to understand with a large number of inputs. Such intricacies generally can account for all possible configuration of weights especially with a large number of inputs, but the examples shown here are more basic and explanatory.

The first example (first row of FIG. 16) shows how some associations are doubled by a new observation while others are left to simply add as new single associations. The second example (second row of FIG. 16) shows how some possible doubling of weights might appear within one dendrite, but by going through the following processing, none of the new associations actually match those of the prior memories.

For example, initial weights and traces for input A are identical across both examples. Input A has a weight of 2 associations below it, and it might be assumed that the new trace of 1 association might match an association already stored. If so, then the doubling of the association should be carried to a high power. However, only the first example has a true doubling of an existing association. While A should propose that it has a possible double in both examples, the second example shows how the trace value of C forces an accounting of the traces for both A and B above it. The trace value in A is accounted by C, but without a corresponding weight. Unlike the first example in which C can match the weight-trace double of A, the possible double in A is split and is not in fact a double in the second example.

Figure 17A:
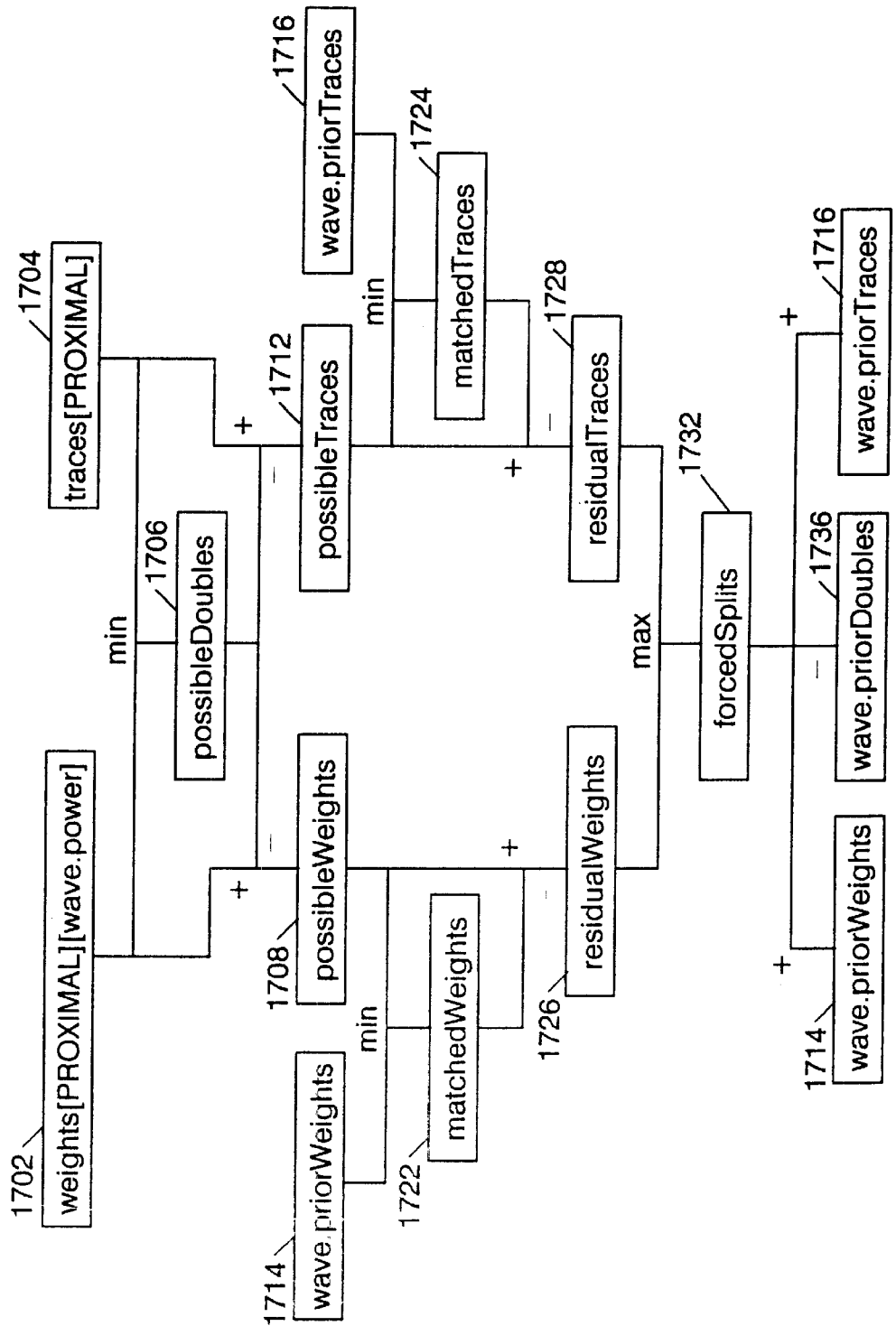

FIGS. 17A–17C outline operations of the data flow process for such logic, using elemental +, −, min, and max functions. As discussed, assume that the wave has accumulated the number of priorWeights, priorDoubles, and priorTraces. From the perspective of a distal dendrite "looking" to receive such a memorize wave, the dendrite can also compute its possible doubles (Block 1706) as the minimum of its proximal weights and traces (Block 1702 and 1704 respectively). This leaves a number of possible weights (Block 1708) and traces (Block 1712) as the number of original weights and traces, minus those candidate doubles.

If these possible doubles are true doubles and can be matched to each other as true doublings of an association, then the possible weights and residual traces of the distal dendrite preferably are accountable by matching weights and traces in the wave. This is a hard constraint; when accounting for a distal wave, all proximal counts of the dendrite preferably are accounted to match the wave's accumulations. Matched weights and traces (Blocks 1722 and 1724) are calculated as the minimums of the dendrite's and wave's weights and traces (Blocks 1714 and 1716), respectively.

If the dendrite's possible weights or traces cannot be accounted for by matching to the wave's accumulations, then the possible doubles in the wave may have been too greedy. This is calculated by finding the residual weights and traces, i.e. the possible values that were not matched at Blocks 1726 and 1728 respectively. The larger residual is the number of wave doubles that must be split into their separate weights and traces in order to balance the accounting. This forced split (Block 1732) is removed from the wave's accumulation of doubles (Block 1736) and given to its individual weights and traces (Blocks 1714 and 1716).

Then, referring to FIG. 17B, the dendrite's possible doubles (Block 1706), which also should be completely accounted before the wave moves on, might be true doubles (Block 1736), but only if the wave is carrying possible doubles (Block 1706) to match it. The minimum of these possible doubles and the wave's doubles are in fact true doubles, which have been found and matched to each other as matched doubles (Block 1746).

Knowing the number of true matchedDoubles, the number of true weights and traces can be calculated. The matchedDoubles are subtracted from the stored weights to determine the truePriorTrace (Block 1748). The matched-Doubles also are subtracted from the stored traces to determine the truePriorTraces (Block 1756).

Finally, referring to FIG. 17C, the dendrite takes the perspective of looking distally before sending the wave to the next dendrite. It calculates the possible next doubles (Block 1766) as the minimum of its distal weights (Block 1762) and traces (Block 1764). Again these are possible doubles, which this process will resolve in the next dendrites. The wave's weights and traces also are updated from the dendrite's distal perspective in order to keep a balanced account of all associations for repeated operation.

FIG. 18 shows an example of programming code for the Double Match Filter operations of FIGS. 17A–17C. Each code block 1802, 1804 and 1806 preferably is sequentially executed, corresponding to the data flow logic shown in FIGS. 17A–17C, respectively. The first block 1802 calculates the possible doubles in the dendrite, including removal of false doubles by calculation of forced splits. The second block 1804 calculates the true matched doubles and accounts (removes) the prior accumulations from the wave. The third block 1806 then adds the next counts to the wave's accumulations of weights, doubles and traces. These code blocks preferably are implemented as one or more private methods (subroutines) that are callable by the memorize and imaging methods of class Dendrite.

Reading

Reading of the artificial neuron now will be described. The calculation of matched doubles is used in both writing and reading operations. As described for memorization, matched doubles indicate which associations in the current sensor pattern are already known so that they can be carried to the next weight power. For the read operation, also called "imagine", matched doubles represent the number of associations in memory (the weights) that match the associations in the new observation (the trace). The Double Match/Filter process also can be the heart of this associative memory's matching function and its measure of similarity/distance.

The read operation is cast as recalling or imaging of past associations given a set of new observations. In other words, the new pattern of observations is clamped to the sensor input neurons and focused to one of the multipolar neurons. This multipolar neuron then imagines the possible output (feed-forward prediction) and imagines possible associations to any other inputs (feedback pattern completion). These two read operations are often referred to as heteroassociation (inputs to output) and autoassociation (inputs to other inputs). In the psychology of learning theory, these elements are referred to as stimulus-response associations and stimulus-stimulus associations, respectively.

The Double Match/Filter process preferably is used for such recalling of memory. Briefly, recall is a comparison for matches between the trace associations of the current observation and the permanent weight associations representing the past. The strengths of the hetero- and auto-associative images may be directly correlated to the degree to which past experiences match the current experience.

Figure 19:
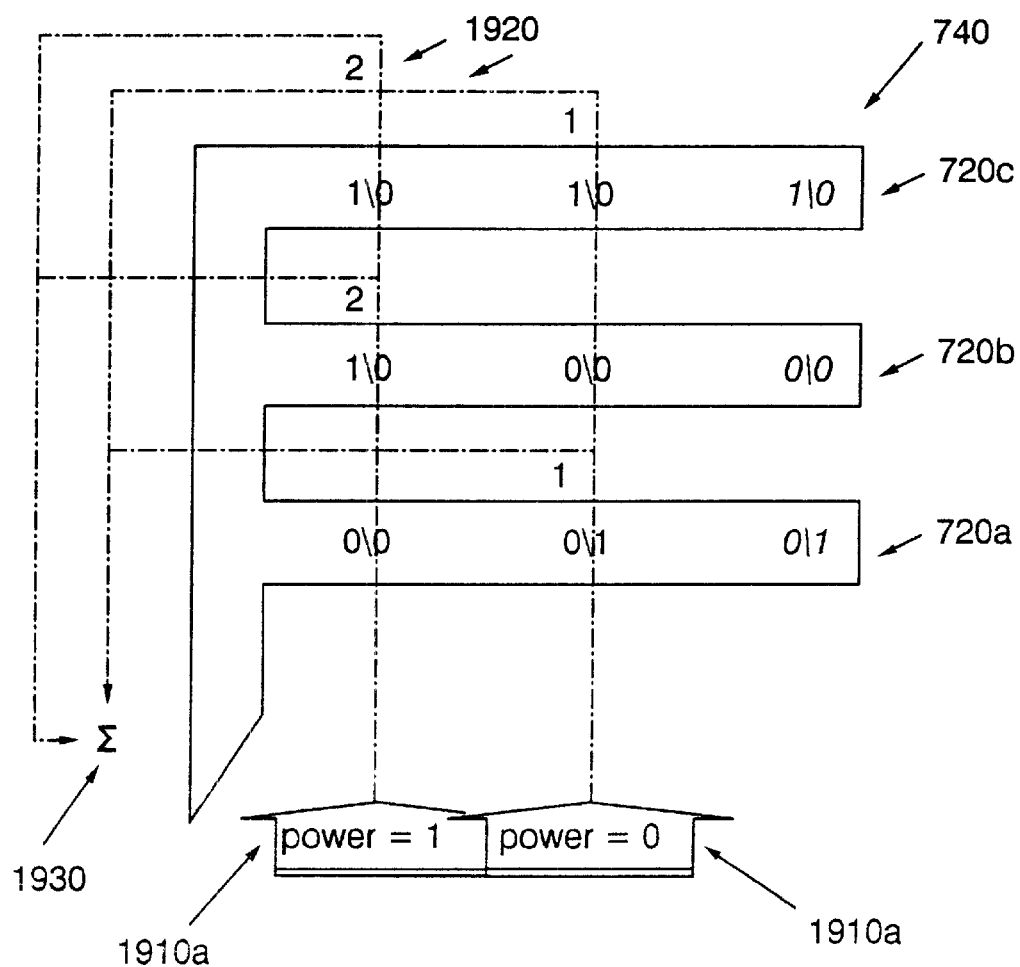
FIG. 19 is a block diagram of reading according to the present invention.

FIG. 19 shows that the imaging wave propagation is "bursty" like the memorize function, but rather than halting when no more carries are required, the imaging function preferably sends a wave through every weight power. Each power represents some of the possible associations, which are all additive. On each pass of the wave for each power $1910a$–$1910b$, the dendrite calculates its number of matches $1920$ to the current observation and accumulates these matches in two directions: forward to the output summation, called relevance, and backward to each respective sensor. The accumulated matches are summed at a summer $1930$.

Given that each multipolar neuron represents some output action or other label-category, relevance is the degree to which the current observation relates to the action or category. This can also be understood as a membership function: how well the new observation belongs to the set of observations associated with this particular output.

Figure 20:
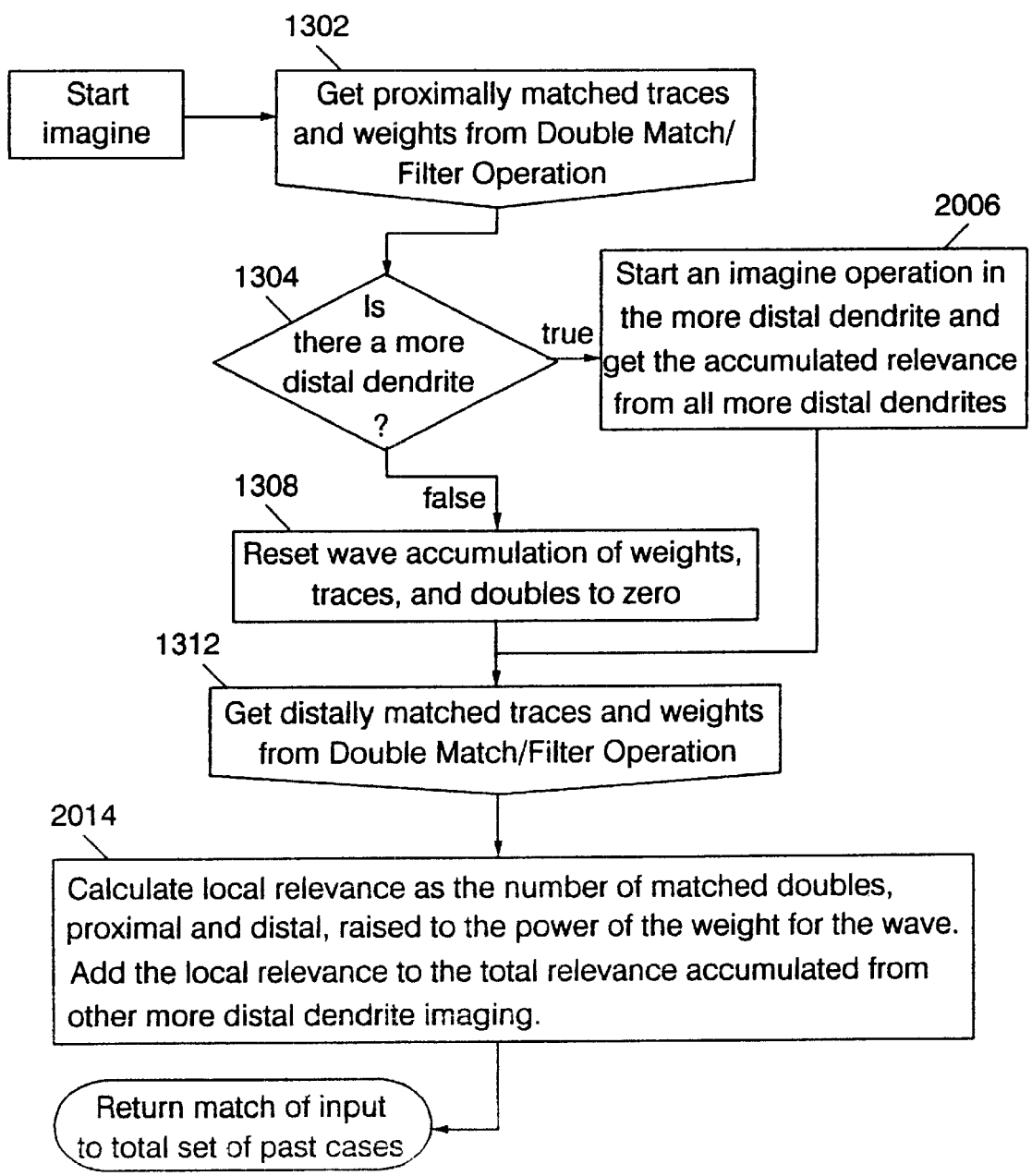
FIGS. 20 and 21 are flowcharts of operations for reading according to the present invention.

FIG. 20 is a flowchart that illustrates operations for reading according to the present invention. It can be seen that reading may be similar to writing (FIG. 13) and it can use the Double Match/Filter. Rather than changing the weights, however, the imagine function accumulates the matched doubles at Block $2006$. The total relevance is accumulated through the recursive structure of dendrites, each dendrite adding both its proximal and distal matches. The matches are accumulated to a value called relevance (Block $2014$). The new observation is relevant, to the degree that its patterns match those of all past observations stored in the memory.

Figure 1A:
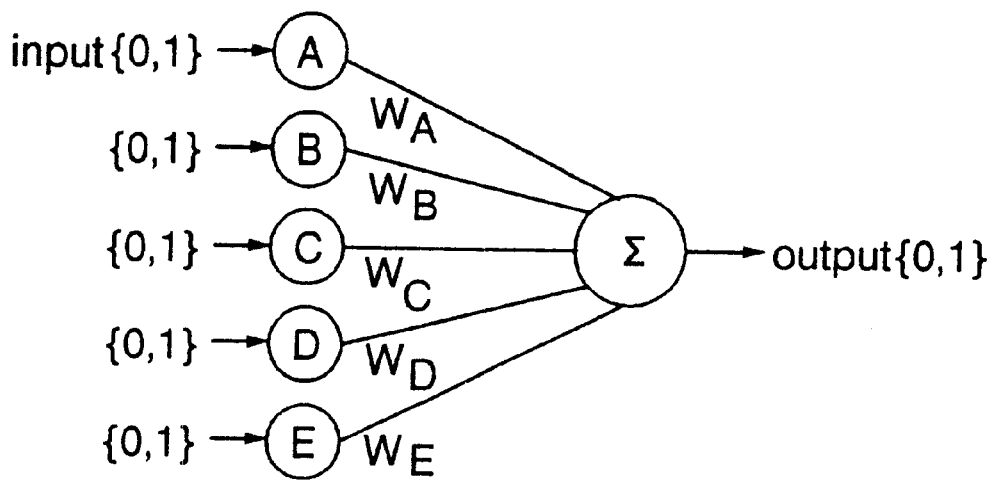
FIGS. 1A and 1B are block diagrams of conventional linear and geometric neural networks, respectively.
Figure 1B:
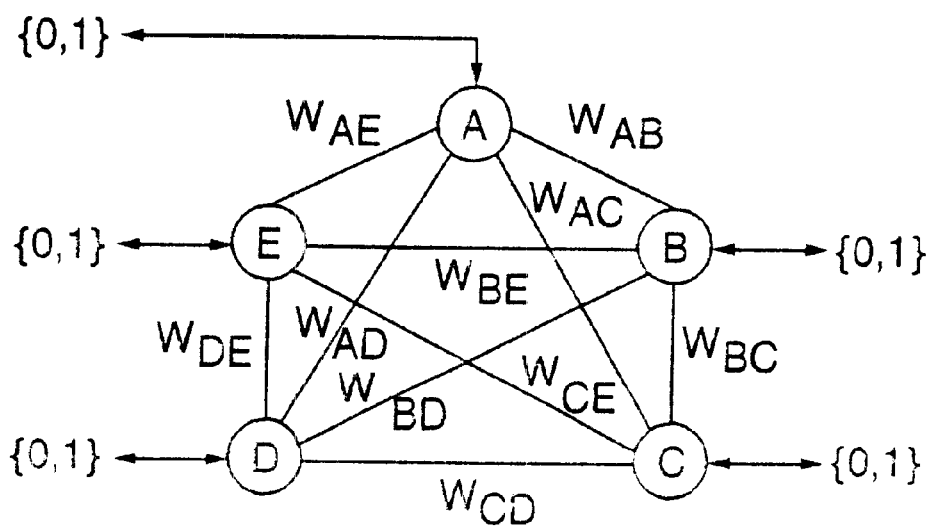

The nonlinear function of this accumulation can be derived from both the linear and nonlinear associative models introduced in FIG. 1. Assume that the relevance value for any observation matrix is composed of both linear and nonlinear terms:

$$\text{Relevance} = w_A A + w_B B - w_{AB} AB$$

Each weight can be calculated from the raw observation counts as $$w_A = w11 + w01 - w10 - w00$$

$$w_B = w11 + w10 - w01 - w00$$

$$w_{AB} = w11 + w00 - w01 - w10$$

which can be rearranged into the following partial formulas in terms of each phase $$\text{relevance00} = w00 \ (-A*B - A - B)$$

$$\text{relevance01} = w01 \ (A - B + A*B)$$

$$\text{relevance10} = w10 \ (B - A + A*B)$$

$$\text{relevance11} = w11 \ (A + B - A*B).$$

Given that the phase is already a filter of A's and B's signal states, it can be seen that the sensor terms are constant for any phase, in fact, a constant of 1 for each phase. For one instance, relevance00=w00. In other words, the partial relevance of each phase is an accumulation of the observation weight. Thus, the present invention can account for both linear and nonlinear associations, even though the physical representation is linear and the recall functions are an accumulation of observation counts. The Double Match/Filter selects those observation counts that represent the current observations.

Figure 21:
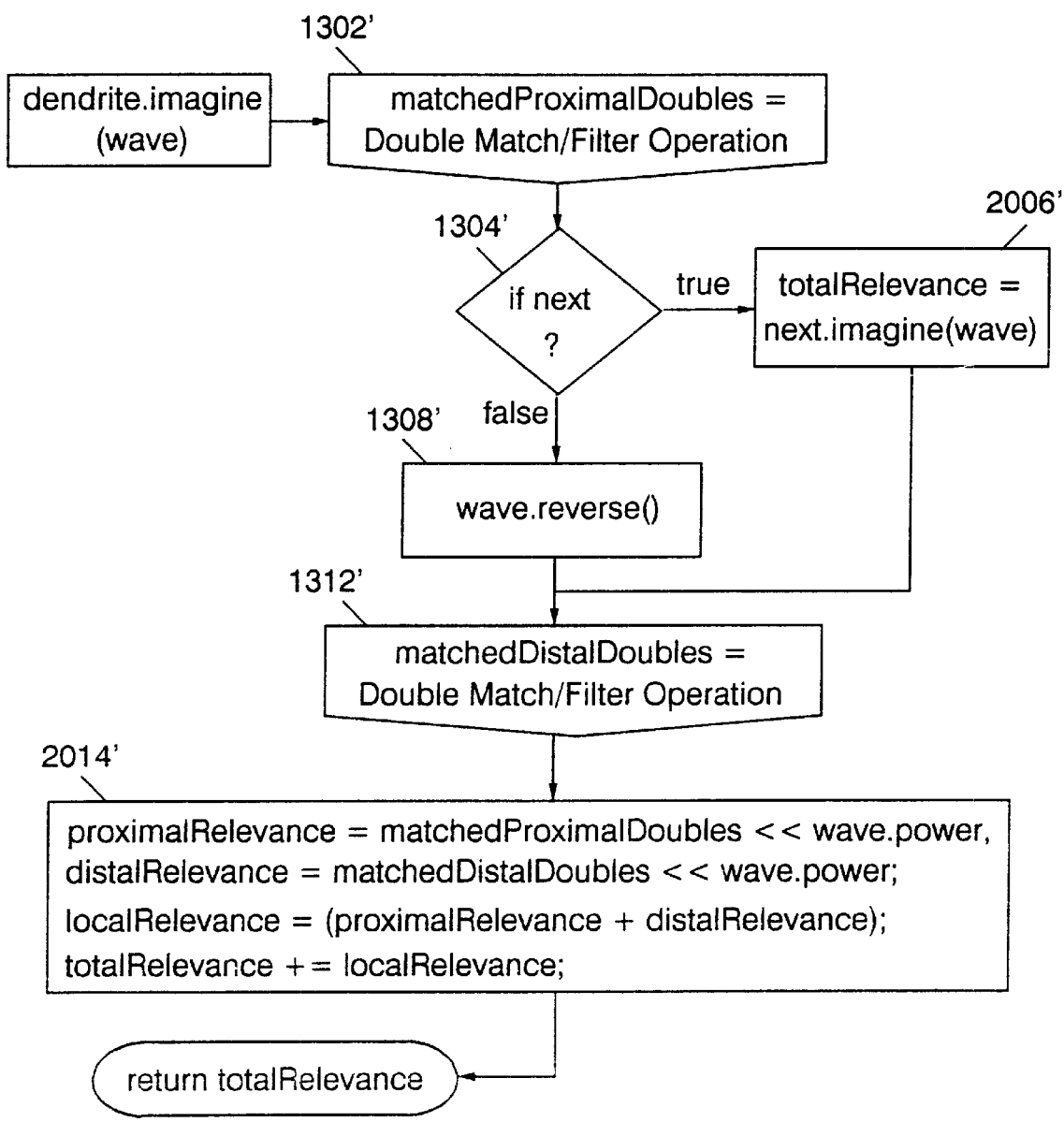

FIG. 21 shows programming code for the embodiment of imaging of FIG. 19. Prime (') notation is used. The Dendrite object has a member function imagine that also takes a wave as an argument. Like the other functions, the calling of dendrites is also recursive, but the imagine process is a READ operation and returns the totalRelevance accumulated through the dendrites (Block $2014'$). Like the memorize function, the imagine operation calls the Double Match/Filter to calculate the number of proximal and distal match doubles. However, rather than changing the weights as in memorize (a WRITE operation), imagine accumulates the relevances. For both the distal and proximal matched doubles, the relevance accounts for the weight power. This exponential increase in relevance is calculated by left-shift of the match doubles. The local relevance of each dendrite's calculations is added to the total relevance returned by other dendrites (Block $2006'$). This concludes the description of the reading operation.

It will be understood that the Purkinje neuron is only one form of multipolar neuron. The pyramidal neurons of the cerebral cortex also are well known, but nervous systems generally display a very wide variety of dendritic branching patterns, many of which are complex and multipolar. Likewise, the present invention can be applied to many other forms of observation counting. The 2×2 observation matrix was introduced as a fundamental element of recording observations and interactions; however, one skilled in the art will recognize that higher dimension matrixes, polar coordinates, Karnaugh maps, Boolean functions, and/or hierarchical structures also can be used to collect observation counts, which can then be decomposed and compressed as was described above.

In fact, even a unipolar neuron can use the present invention within its only dendrite. For instance, the ratio between A and B results in a single 1×1 cell, one value for each pairwise combination of inputs. This is equivalent to a single weighted graph, which can be decomposed into a set of un-weighted power graphs, which in turn can be dynamically programmed as above. A single dendritic recursion, perhaps the only one in a unipolar neuron, could then represent such ratio numbers.

In summary, the incremental learning and recall of observations has been described within a multipolar neuron, composed of primary branches for each possible pair-wise combination of terms. Although other multipolar structures can be represented, this 2×2 observation matrix provided an example of four phases. Each branch preferably is composed of recursive dendrites, each dendrite connected to one bipolar input neuron and containing a set of weights and traces. Each dendrite stores weight pairs, one weight storing the number of associations to other dendrites proximal to it, and one weight storing the number of associations to other dendrites distal to it. The dendrite preferably stores multiple weight pairs, one pair for each base-two power of possible weights. The total number of weight pairs per dendrite thus can be limited to $\log_2$ of all stored observations. Each dendrite also preferably contains a single pair of transient traces, which represent the current observation using the same proximal/distal form of accumulation weights.

Several operations using dynamic programming can allow reading from and writing to the memory in linear space and time, even though the accounting approximates nonlinear associations between all inputs. All operations can use wave propagation in which the wave filters the dendrites' phase orientation and carries the accumulation of their signals as it travels from one dendrite to another. A Double Match/Filter can process the hard constraints between dendritic weights and traces, resulting in an implicit enumeration of past associations that are matched by the current observation. Thus, weights can be added and carried from one weight power to another during the memorize operation. It also measures the pattern match between past memories and the new input in order to determine the relevance of the new observation and the sensitivity of each input in effecting such relevance.

The hypermachine scaling factor of the present invention can profoundly broaden the general utility of associative memories. Although the implementation described here may admit some loss in its compression from nonlinear to linear, an incremental-loading, parameter-free, nonlinear associator now can be physically implemented in a linear size and speed to open new possibilities for machine learning, both at the largest scales of the Internet and the smallest scales of wireless devices.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An artificial neuron comprising:
   a plurality of inputs; and
   a plurality of dendrites, a respective one of which is uniquely associated with a respective one of the plurality of inputs, each dendrite comprising a power series of weights, each weight in a power series including an associated count for the associated power.

2. An artificial neuron according to claim 1 wherein the power series of weights is a base two power series of weights, each weight in the base two power series including an associated count that represents a bit position of the associated count.

3. An artificial neuron according to claim 1 wherein the counts are statistical counts.

4. An artificial neuron according to claim 1 wherein the dendrites are sequentially ordered and wherein the power series of weights comprises a pair of first and second power series of weights, each weight in the first power series including a first count that is a function of associations of prior dendrites and each weight in the second power series including a second count that is a function of associations of next dendrites.

5. An artificial neuron according to claim 4 wherein each dendrite further comprises:
   a trace that is responsive to an input signal at the associated input, the trace including a first trace count that is a function of associations of the input signal at prior dendrites and a second trace count that is a function of associations of the input signal at next dendrites, the respective first and second power series being responsive to the respective first and second trace counts.

6. An artificial neuron according to claim 5 wherein each trace comprises a power series of first trace counts that is a function of associations of the input signal at prior dendrites and a power series of second trace counts that is a function of associations of the input signal at next dendrites.

7. An artificial neuron according to claim 6 wherein the trace wave propagator propagates the trace along the sequentially ordered dendrites in a forward direction and in a reverse direction.

8. An artificial neuron according to claim 6 wherein the trace wave propagator further propagates carry results of the trace along the power series of weights in the plurality of dendrites to provide memorization of the input signal.

9. An artificial neuron according to claim 8 wherein the trace wave propagator further comprises a Double Match/Filter that identifies carry results for a weight in a dendrite, for propagation to a next higher power weight.

10. An artificial neuron according to claim 9 wherein the Double Match/Filter identifies carry results for a weight in a dendrite based upon co-occurrence of a weight and a trace.

11. An artificial neuron according to claim 5 further comprising:
    a converter that converts the input signal into the first and second trace counts.

12. An artificial neuron according to claim 5 further comprising:
    a trace wave propagator that propagates the respective first and second trace counts into the respective first and second power series of weights.

13. An artificial neuron according to claim 5 wherein the function of associations of the input signal at prior dendrites is a sum of associations of the input signal at prior dendrites and wherein the function of associations of the input signal at next dendrites is a sum of associations of the input signal at next dendrites.

14. An artificial neuron according to claim 5 further comprising an accumulator that accumulates matches between the first and second trace counts and the first and second power series of weights to provide a reading operation.

15. An artificial neuron according to claim 14 wherein the accumulator accumulates matches between the first and second trace counts to all of the counts in the first and second power series of weights, regardless of whether carry results are produced.

16. An artificial neuron according to claim 14 further comprising a summer that is responsive to the accumulator to sum results of the accumulations of matches of the first and second trace counts to the first and second power series of weights.

17. An artificial neuron according to claim 4 wherein the function of associations of prior dendrites is a sum of associations of prior dendrites and the function of associations of next dendrites is a sum of associations of next dendrites.

18. An artificial neuron according to claim 4 wherein the pair of first and second power series of weights is a first pair of first and second power series of weights corresponding to a first observation phase of the plurality of inputs and wherein each dendrite further comprises a second pair of first and second power series of weights that correspond to a second observation phase of the plurality of inputs.

19. An artificial neuron according to claim 8 wherein each dendrite further comprises:

a trace that is responsive to an input signal at the associated input, the trace including a first trace count that is a function of associations of the input signal at prior dendrites and a second trace count that is a function of associations of the input signal at next dendrites, the respective first and second power series in the first and second pairs being responsive to the respective first and second trace counts.

20. An artificial neuron according to claim 19 wherein each trace comprises a power series of first trace counts that is a function of associations of the input signal at prior dendrites and a power series of second trace counts that is a function of associations of the input signal at next dendrites.

21. An artificial neuron according to claim 20 further comprising:

means for generating the first and second trace counts from the input signal.

22. An artificial neuron according to claim 20 further comprising:

means for propagating the respective first and second trace counts into the respective first and second pairs of power series of weights.

23. An artificial neuron according to claim 1 wherein the power series of weights is a first power series of weights corresponding to a first observation phase and wherein each dendrite further comprises a second power series of weights corresponding to a second observation phase, each weight in the second power series including a count for the associated power in the second observation phase.

24. An artificial neuron comprising:

a plurality of inputs that are sequentially ordered; and a plurality of pairs of first and second weights, a respective pair being uniquely associated with a respective one of the plurality of inputs, each first weight being a function of associations of prior inputs of the plurality of sequentially ordered inputs and each second weight being a function of associations of next inputs in the plurality of sequentially ordered inputs.

25. An artificial neuron according to claim 24 wherein the function of associations of prior and next inputs is a statistical function of associations of prior and next inputs.

26. An artificial neuron according to claim 24 wherein the function of associations of prior and next inputs is a sum of associations of prior and next inputs.

27. An artificial neuron according to claim 24 further comprising:

a trace that is responsive to an input signal at the associated input, the trace including a first trace count that is a function of associations of the input signal at prior inputs of the plurality of sequentially ordered inputs and a second trace count that is a function of associations of the input signal at next inputs in the plurality of sequentially ordered inputs, the respective first and second weights being responsive to the respective first and second trace counts.

28. An artificial neuron comprising:

a plurality of inputs that are sequentially ordered; and a plurality of pairs of first and second weights, a respective pair being uniquely associated with a respective one of the plurality of inputs, each first weight being a first statistical function of the plurality of sequentially ordered inputs and each second weight being a second statistical function of the plurality of sequentially ordered inputs.

29. An artificial neuron according to claim 28 further comprising:

a trace that is responsive to an input signal at the associated input, the trace including a first trace count that is the first statistical function of the input signal and a second trace count that is the second statistical function of the input signal, the respective first and second weights being responsive to the respective first and second trace counts.

30. An artificial neuron comprising:

a plurality of inputs; and a plurality of power series of weights, a respective power series of weights being uniquely responsive to a respective one of the plurality of inputs, each weight in a power series including an associated count for the associated power of the associated input.

31. An artificial neuron according to claim 30 wherein the plurality of power series of weights is a plurality of base two power series of weights, each weight in a base two power series including an associated count that represents a bit position of the associated count.

32. An artificial neuron according to claim 30 wherein the counts are statistical counts.

33. An artificial neuron according to claim 30 wherein the inputs are sequentially ordered and wherein the plurality of power series of weights comprises first and second power series of weights that are responsive to a respective one of the plurality of inputs, each weight in the first power series including an associated first count that represents a sum of prior inputs for the associated power of the associated input in the sequentially ordered inputs and each weight in the second power series including an associated second count that represents a sum of next inputs in the sequentially ordered inputs for the associated power of the associated input.

34. An artificial neuron according to claim 33 further comprising:

a plurality of traces, a respective one of which is responsive to a respective one of the plurality of inputs, each trace including a first trace count that represents a sum of prior inputs and a second trace count that represents a sum of next inputs, the respective first and second power series being responsive to the respective first and second trace counts.

35. An artificial neuron according to claim 30 wherein the plurality of power series of weights is a plurality of first power series of weights corresponding to a first observation phase and wherein the artificial neuron further comprises a plurality of second power series of weights corresponding to a second observation phase, a respective second power series of weights being responsive to a respective one of the plurality of inputs, each weight in a power series including an associated count for the associated power of the associated input for the second observation phase.

36. A method of memorizing a plurality of inputs into an artificial neuron that includes a plurality of dendrites, a respective one of which is uniquely associated with a respective one of the plurality of inputs, the method comprising the steps of:

provide a power series of weights for each dendrite, each weight in a power series including an associated count for the associated power;

converting the input signal into a power series of trace counts that is a function of associations of the input signal; and propagating the respective first and second trace counts into the respective power series of weights.

37. A method according to claim 36:

wherein the dendrites are sequentially ordered and wherein the power series of weights comprises a pair of first and second power series of weights, each weight in the first power series including a first count that is a function of associations of prior dendrites and each weight in the second power series including a second count that is a function of associations of next dendrites; and wherein each trace comprises a power series of first trace counts that is a functions of associations of the input signal at prior dendrites and a power series of second trace counts that is a function of associations of the input signal at next dendrites.

38. A method according to claim 37 wherein the step of propagating comprises the step of propagating the respective first and second trace counts into the respective power series of weights in a forward direction and in a reverse direction.

39. A method according to claim 36 wherein the step of propagating further comprises the step of propagating carry results of the trace along the power series of weights in the plurality of dendrites.

40. A method according to claim 39 wherein the step of propagating carry results comprises the step of double match filtering the trace to identify carry results for a weight in a dendrite, for propagation to a next higher power weight.

41. A method according to claim 40 wherein the step of double match filtering comprises the step of identifying carry results for a weight in a dendrite based upon co-occurrence of a weight and a trace.

42. A method according to claim 36 further comprising the step of accumulating matches between the first and second trace counts and the first and second power series of weights to read the artificial neuron.

43. A method according to claim 42 wherein the accumulating step comprises the step of accumulating matches between the first and second trace counts and all of the counts in the first and second power series of weights, regardless of whether carry results are produced.

44. A method according to claim 42 further comprising the step of summing results of the accumulating step.

45. A method of reading an artificial neuron that includes a plurality of dendrites, the method comprising the steps of:

providing a power series of weights for each dendrite, each weight in a power series including an associated count for the associated power for a plurality of dendrites, a respective one of which is uniquely associated with a respective one of the plurality of inputs;

converting an input signal into a power series of trace counts that is a function of associations of the input signal; and accumulating matches between the first and second trace counts and the first and second power series of weights.

46. A method according to claim 45 wherein the accumulating step comprises the step of accumulating matches between the first and second trace counts and all of the counts in the first and second power series of weights, regardless of whether carry results are produced.

47. A method according to claim 45 further comprising the step of summing results of the accumulating step.

48. A method according to claim 45:

wherein the dendrites are sequentially ordered and wherein the power series of weights comprises a pair of first and second power series of weights, each weight in the first power series including a first count that is a function of associations of prior dendrites and each weight in the second power series including a second count that is a function of associations of next dendrites; and wherein each trace comprises a power series of first trace counts that is a function of associations of the input signal at prior dendrites and a power series of second trace counts that is a function of associations of the input signal at next dendrites.

49. A computer program product for providing an artificial neuron, the computer program product comprising a computer-readable storage medium having computer-readable program code embodied in the medium, the computer-readable program code comprising:

computer-readable program code that provides a plurality of inputs; and computer-readable program code that provides a plurality of dendrites, a respective one of which is uniquely associated with a respective one of the plurality of inputs, each dendrite comprising a power series of weights, each weight in a power series including an associated count for the associated power.

50. A computer program product according to claim 49 wherein the power series of weights is a base two power series of weights, each weight in the base two power series including an associated count that represents a bit position of the associated count.

51. A computer program product according to claim 49 wherein the counts are statistical counts.

52. A computer program product according to claim 49 wherein the dendrites are sequentially ordered and wherein the power series of weights comprises a pair of first and second power series of weights, each weight in the first power series including a first count that is a function of associations of prior dendrites and each weight in the second power series including a second count that is a function of associations of next dendrites.

53. A computer program product according to claim 52 wherein each dendrite further comprises:

a trace that is responsive to an input signal at the associated input, the trace including a first trace count that is a function of associations of the input signal at prior dendrites and a second trace count that is a function of associations of the input signal at next dendrites, the respective first and second power series being responsive to the respective first and second trace counts.

54. A computer program product according to claim 53 wherein each trace comprises a power series of first trace counts that is a function of associations of the input signal at prior dendrites and a power series of second trace counts that is a function of associations of the input signal at next dendrites.

55. A computer program product according to claim 54 wherein the computer-readable program code provides a trace wave propagator that propagates the trace along the sequentially ordered dendrites in a forward direction and in a reverse direction.

56. A computer program product according to claim 54 wherein the computer-readable program code that provides a trace wave propagator that further propagates carry results of the trace along the power series of weights in the plurality of dendrites to provide memorization of the input signal.

57. A computer program product according to claim 56 wherein the computer-readable program code that provides a trace wave propagator that further comprises computer-readable program code that provides a Double Match/Filter that identifies carry results for a weight in a dendrite, for propagation to a next higher power weight.

58. A computer program product according to claim 57 wherein the Double Match/Filter identifies carry results for a weight in a dendrite based upon co-occurrence of a weight and a trace.

59. A computer program product according to claim 53 further comprising:
computer-readable program code that provides a converter that converts the input signal into the first and second trace counts.

60. A computer program product according to claim 53 further comprising:
computer-readable program code that provides a trace wave propagator that propagates the respective first and second trace counts into the respective first and second power series of weights.

61. A computer program product according to claim 53 wherein the function of associations of the input signal at prior dendrites is a sum of associations of the input signal at prior dendrites and wherein the function of associations of the input signal at next dendrites is a sum of associations of the input signal at next dendrites.

62. A computer program product according to claim 53 further comprising computer-readable program code that provides an accumulator that accumulates matches between the first and second trace counts and the first and second power series of weights to provide a reading operation.

63. A computer program product according to claim 62 wherein the computer-readable program code that provides an accumulator that accumulates matches between the first and second trace counts to all of the counts in the first and second power series of weights, regardless of whether carry results are produced.

64. A computer program product according to claim 62 further comprising computer-readable program code that provides a summer that is responsive to the accumulator to sum results of the accumulations of matches of the first and second trace counts to the first and second power series of weights.

65. A computer program product according to claim 52 wherein the function of associations of prior dendrites is a sum of associations of prior dendrites and the function of associations of next dendrites is a sum of associations of next dendrites.

66. A computer program product according to claim 52 wherein the pair of first and second power series of weights is a first pair of first and second power series of weights corresponding to a first observation phase of the plurality of inputs and wherein each dendrite further comprises a second pair of first and second power series of weights that correspond to a second observation phase of the plurality of inputs.

67. A computer program product according to claim 66 wherein each dendrite further comprises:
a trace that is responsive to an input signal at the associated input, the trace including a first trace count that is a function of associations of the input signal at prior dendrites and a second trace count that is a function of associations of the input signal at next dendrites, the respective first and second power series in the first and second pairs being responsive to the respective first and second trace counts.

68. A computer program product according to claim 67 wherein each trace comprises a power series of first trace counts that is a function of associations of the input signal at prior dendrites and a power series of second trace counts that is a function of associations of the input signal at next dendrites.

69. A computer program product according to claim 68 further comprising:
computer-readable program code means for generating the first and second trace counts from the input signal.

70. A computer program product according to claim 68 further comprising:
computer-readable program code means for propagating the respective first and second trace counts into the respective first and second pairs of power series of weights.

71. A computer program product according to claim 49 wherein the power series of weights is a first power series of weights corresponding to a first observation phase and wherein each dendrite further comprises a second power series of weights corresponding to a second observation phase, each weight in the second power series including a count for the associated power in the second observation phase.

72. A computer program product for providing an artificial neuron, the computer program product comprising a computer-readable storage medium having computer-readable program code embodied in the medium, the computer-readable program code comprising:
computer-readable program code that provides a plurality of inputs that are sequentially ordered; and
computer-readable program code that provides a plurality of pairs of first and second weights, a respective pair being uniquely associated with a respective one of the plurality of inputs, each first weight being a function of associations of prior inputs of the plurality of sequentially ordered inputs and each second weight being a function of associations of next inputs in the plurality of sequentially ordered inputs.

73. A computer program product according to claim 72 wherein the function of associations of prior and next inputs is a statistical function of associations of prior and next inputs.

74. A computer program product according to claim 72 wherein the function of associations of prior and next inputs is a sum of associations of prior and next inputs.

75. A computer program product according to claim 72 further comprising:
computer-readable program code that provides a trace that is responsive to an input signal at the associated input, the trace including a first trace count that is a function of associations of the input signal at prior inputs of the plurality of sequentially ordered inputs and a second trace count that is a function of associations of the input signal at next inputs in the plurality of sequentially ordered inputs, the respective first and second weights being responsive to the respective first and second trace counts.

76. A computer program product for providing an artificial neuron, the computer program product comprising a computer-readable storage medium having computer-readable program code embodied in the medium, the computer-readable program code comprising:

computer-readable program code that provides a plurality of inputs that are sequentially ordered; and computer-readable program code that provides a plurality of pairs of first and second weights, a respective pair being uniquely associated with a respective one of the plurality of inputs, each first weight being a first statistical function of the plurality of sequentially ordered inputs and each second weight being a second statistical function of the plurality of sequentially ordered inputs.

77. A computer program product according to claim 76 further comprising:

computer-readable program code that provides a trace that is responsive to an input signal at the associated input, the trace including a first trace count that is the first statistical function of the input signal and a second trace count that is the second statistical function of the input signal, the respective first and second weights being responsive to the respective first and second trace counts.

78. A computer program product for providing an artificial neuron, the computer program product comprising a computer-readable storage medium having computer-readable program code embodied in the medium, the computer-readable program code comprising:

computer-readable program code that provides a plurality of inputs; and computer-readable program code that provides a plurality of power series of weights, a respective power series of weights being uniquely responsive to a respective one of the plurality of inputs, each weight in a power series including an associated count for the associated power of the associated input.

79. A computer program product according to claim 78 wherein the plurality of power series of weights is a plurality of base two power series of weights, each weight in a base two power series including an associated count that represents a bit position of the associated count.

80. A computer program product according to claim 78 wherein the counts are statistical counts.

81. A computer program product according to claim 78 wherein the inputs are sequentially ordered and wherein the plurality of power series of weights comprises first and second power series of weights that are responsive to a respective one of the plurality of inputs, each weight in the first power series including an associated first count that represents a sum of prior inputs for the associated power of the associated input in the sequentially ordered inputs and each weight in the second power series including an associated second count that represents a sum of next inputs in the sequentially ordered inputs for the associated power of the associated input.

82. A computer program product according to claim 81 further comprising:

a plurality of traces, a respective one of which is responsive to a respective one of the plurality of inputs, each trace including a first trace count that represents a sum of prior inputs and a second trace count that represents a sum of next inputs, the respective first and second power series being responsive to the respective first and second trace counts.

83. A computer program product according to claim 78 wherein the plurality of power series of weights is a plurality of first power series of weights corresponding to a first observation phase and wherein the artificial neuron further comprises a plurality of second power series of weights corresponding to a second observation phase, a respective second power series of weights being responsive to a respective one of the plurality of inputs, each weight in a power series including an associated count for the associated power of the associated input for the second observation phase.

* * * * *

UNITED STATES PATENT AND TRADEMARK OFFICE
CERTIFICATE OF CORRECTION

PATENT NO. : 6,581,049 B1
DATED : June 17, 2003
INVENTOR(S) : Aparicio, Iv et al.

It is certified that error appears in the above-identified patent and that said Letters Patent is hereby corrected as shown below:

Column 19,
Line 8, should read -- 19. An artificial neuron according to claim 18 wherein each --

Signed and Sealed this

Sixteenth Day of December, 2003

JAMES E. ROGAN
*Director of the United States Patent and Trademark Office*